(12) United States Patent
Oguchi

(10) Patent No.: US 8,867,354 B2
(45) Date of Patent: Oct. 21, 2014

(54) TRANSMISSION CONTROL METHOD, TRANSMISSION CONTROL SYSTEM, COMMUNICATION DEVICE AND RECORDING MEDIUM OF TRANSMISSION CONTROL PROGRAM

(75) Inventor: Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 68 days.

(21) Appl. No.: 13/402,281

(22) Filed: Feb. 22, 2012

(65) Prior Publication Data

US 2012/0213069 A1 Aug. 23, 2012

(30) Foreign Application Priority Data

Feb. 23, 2011 (JP) .................................. 2011-037434

(51) Int. Cl.
*H04W 80/06* (2009.01)
*H04L 29/06* (2006.01)

(52) U.S. Cl.
CPC ............. *H04W 80/06* (2013.01); *H04L 69/163* (2013.01)
USPC ............ 370/231; 370/235; 370/401; 370/474

(58) Field of Classification Search
USPC ....................................................... 370/231
See application file for complete search history.

(56) References Cited

U.S. PATENT DOCUMENTS

| | | | | |
|---|---|---|---|---|
| 6,091,733 | A * | 7/2000 | Takagi et al. ................. | 370/401 |
| 6,490,251 | B2 * | 12/2002 | Yin et al. ..................... | 370/236.1 |
| 6,775,296 | B1 * | 8/2004 | Kitamura ...................... | 370/466 |
| 6,961,327 | B2 * | 11/2005 | Niu ............................... | 370/338 |
| 7,200,111 | B2 * | 4/2007 | Garcia-Luna-Aceves et al. ............................ | 370/230 |
| 7,319,668 | B2 * | 1/2008 | Kobayashi .................... | 370/231 |
| 7,577,097 | B2 * | 8/2009 | Tan et al. ...................... | 370/237 |
| 7,672,241 | B2 * | 3/2010 | Foore et al. ................... | 370/235 |
| 7,760,638 | B2 * | 7/2010 | Shimonishi et al. .......... | 370/235 |
| 7,778,164 | B2 * | 8/2010 | Shimonishi ................... | 370/229 |
| 7,782,759 | B2 * | 8/2010 | Sridharan et al. ............ | 370/216 |
| 7,974,195 | B2 * | 7/2011 | Jin et al. ........................ | 370/231 |
| 8,032,809 | B2 * | 10/2011 | Park et al. ..................... | 714/749 |

(Continued)

FOREIGN PATENT DOCUMENTS

| | | |
|---|---|---|
| JP | 2004-032453 | 1/2004 |
| JP | 2008-518531 | 5/2008 |

(Continued)

OTHER PUBLICATIONS

Weig et al., May 4, 2006, World Intellectual Property Organization, WO 2006/045345 (all).*

(Continued)

*Primary Examiner* — Ian N Moore
*Assistant Examiner* — Lakeram Jangbahadur
(74) *Attorney, Agent, or Firm* — Staas & Halsey LLP

(57) ABSTRACT

A transmission control method includes performing communication between a transmission source communication device and a transmission destination communication device by using a transmission control protocol which includes a plurality of congestion control functions corresponding to a plurality of congestion control methods, respectively, and causing, when the transmission source communication device and the transmission destination communication device switch from a first congestion control function to a second congestion control function, at least one of a plurality of parameters for controlling operating states in the first congestion control function to be inherited by a parameter for controlling an operating state in the second congestion control function.

15 Claims, 21 Drawing Sheets

(56) References Cited

U.S. PATENT DOCUMENTS

| | | | |
|---|---|---|---|
| 8,159,943 B2* | 4/2012 | Garcia et al. | 370/231 |
| 8,340,126 B2* | 12/2012 | Egan et al. | 370/468 |
| 2006/0242319 A1* | 10/2006 | Sang et al. | 709/240 |
| 2007/0280107 A1* | 12/2007 | Ludwig et al. | 370/230 |
| 2011/0090795 A1* | 4/2011 | Li et al. | 370/235 |
| 2012/0087244 A1* | 4/2012 | Leung | 370/236 |
| 2012/0087245 A1* | 4/2012 | Leung | 370/236 |
| 2012/0124135 A1* | 5/2012 | Nagpal et al. | 709/204 |

FOREIGN PATENT DOCUMENTS

| | | |
|---|---|---|
| JP | 2008-252246 | 10/2008 |
| JP | 2009-124367 | 6/2009 |
| WO | 2006/045345 A2 | 5/2006 |

OTHER PUBLICATIONS

Hideyuki Shimonishi et al., "TCP-Adaptive Reno for Improving Efficiency-Friendliness Tradeoffs of TCP Congestion Control Algorithm"; System Platform Laboratory, NEC Corporation, 1753; pp. 1-5.

M. Sridhran et al "Compound TCP: A New TCP Congestion Control for High-Speed and Long Distance Networks"; Network Working Group; Apr. 3, 2009; pp. 1-16.

* cited by examiner

FIG. 2

| CHANNEL BANDWIDTH | 3.5MHz | | 1.25MHz | | 5MHz | | 10MHz | |
|---|---|---|---|---|---|---|---|---|
| PHY MODE | 256 OFDM | | 128 OFDMA | | 512 OFDMA | | 1,024 OFDMA | |
| OVERSAMPLING | 8/7 | | 28/25 | | 28/25 | | 28/25 | |
| MODULATION & CODE RATE | PHY-LAYER DATA RATE (kbps) | | | | | | | |
| | DL | UL | DL | UL | DL | UL | DL | UL |
| BPSK,1/2 | 946 | 326 | NOT APPLICABLE | | | | | |
| QPSK1/2 | 1,882 | 653 | 504 | 154 | 2,520 | 653 | 5,040 | 1,344 |
| QPSK3/4 | 2,822 | 979 | 756 | 230 | 3,780 | 979 | 7,560 | 2,016 |
| 16QAM,1/2 | 3,763 | 1,306 | 1,008 | 307 | 5,040 | 1,306 | 10,080 | 2,688 |
| 16QAM,3/4 | 5,645 | 1,958 | 1,512 | 461 | 7,560 | 1,958 | 15,120 | 4,032 |
| 64QAM,1/2 | 5,645 | 1,958 | 1,512 | 461 | 7,560 | 1,958 | 15,120 | 4,032 |
| 64QAM,2/3 | 7,526 | 2,611 | 2,016 | 614 | 10,080 | 2,611 | 20,160 | 5,376 |
| 64QAM,3/4 | 8,467 | 2,938 | 2,268 | 691 | 11,340 | 2,938 | 22,680 | 6,048 |
| 64QAM,5/6 | 9,408 | 3,264 | 2,520 | 768 | 12,600 | 3,264 | 25,200 | 6,720 |

FIG. 7

| OPTION | CONTENT |
|---|---|
| 0 | END OF OPTION. INDICATES END OF TCP OPTION LIST. |
| 1 | NO-OP (NO-OPeration). DOES NOT HAVE SPECIAL MEANING. ONE TO THREE BITS ARE USED SO AS TO BE ARRANGED TO 32-BIT UNIT. |
| 2 | MSS (MAXIMUM SEGMENT SIZE). INDICATES RECEIVABLE MAXIMUM SEGMENT SIZE. |
| 3 | WINDOW SCALE. USED TO INDICATE WINDOW SIZE LARGER THAN 64 Kbytes. DEFINED BY RFC1323. |
| 4 | SELECTIVE ACKNOWLEDGEMENT = SAAC. USED TO OPTIMIZE ACKNOWLEDGEMENT CONFIRMATION RESPONSE ALGORITHM. USELESS RETRANSMISSION CAN BE STOPPED AND TRANSFER EFFICIENCY CAN BE IMPROVED BY PARTIALLY RETURNING ACK RATHER THAN CONSECUTIVE AREA. DEFINED BY RFC2018. |
| 5 | TCP TIME STAMP. USED TO EMBED TIME STAMP (TRANSMISSION TIME) INFORMATION IN PACKET. ROUND TRIP TIME OF PACKET IS MEASURED FROM TIME STAMP INFORMATION SO AS TO OPTIMIZE RETRANSMISSION TIMER ALGORITHM OF TCP. |
| 16 | ADAPTIVE PROTOCOL CAPABILITY OPTION. EXCHANGES CAPABILITIES OF ADAPTIVELY SELECTABLE TCP PROTOCOL. |
| 17 | PROTOCOL SWITCHING REQUEST. DESIGNATES PROTOCOL TYPE TO BE SWITCHED AND SWITCHING TIMING. |
| 18 | PROTOCOL SWITCHING ACK |

FIG. 9

| AVERAGE DISCARD RATE = SMALL | | AVERAGE DELAY | | |
|---|---|---|---|---|
| | | SMALL | MEDIUM | LARGE |
| AVERAGE BANDWIDTH VARIATION RATE | SMALL | Reno | Westwood | BIC |
| | MEDIUM | BIC | htcp | Scalable |
| | LARGE | htcp | BIC | BIC |

| AVERAGE DISCARD RATE = MEDIUM | | AVERAGE DELAY | | |
|---|---|---|---|---|
| | | SMALL | MEDIUM | LARGE |
| AVERAGE BANDWIDTH VARIATION RATE | SMALL | Westwood | Westwood | BIC |
| | MEDIUM | Westwood | Htcp | Htcp |
| | LARGE | Scalable | htcp | htcp |

| AVERAGE DISCARD RATE = LARGE | | AVERAGE DELAY | | |
|---|---|---|---|---|
| | | SMALL | MEDIUM | LARGE |
| AVERAGE BANDWIDTH VARIATION RATE | SMALL | Scalable | Westwood | BIC |
| | MEDIUM | Westwood | Htcp | Htcp |
| | LARGE | Scalable | htcp | htcp |

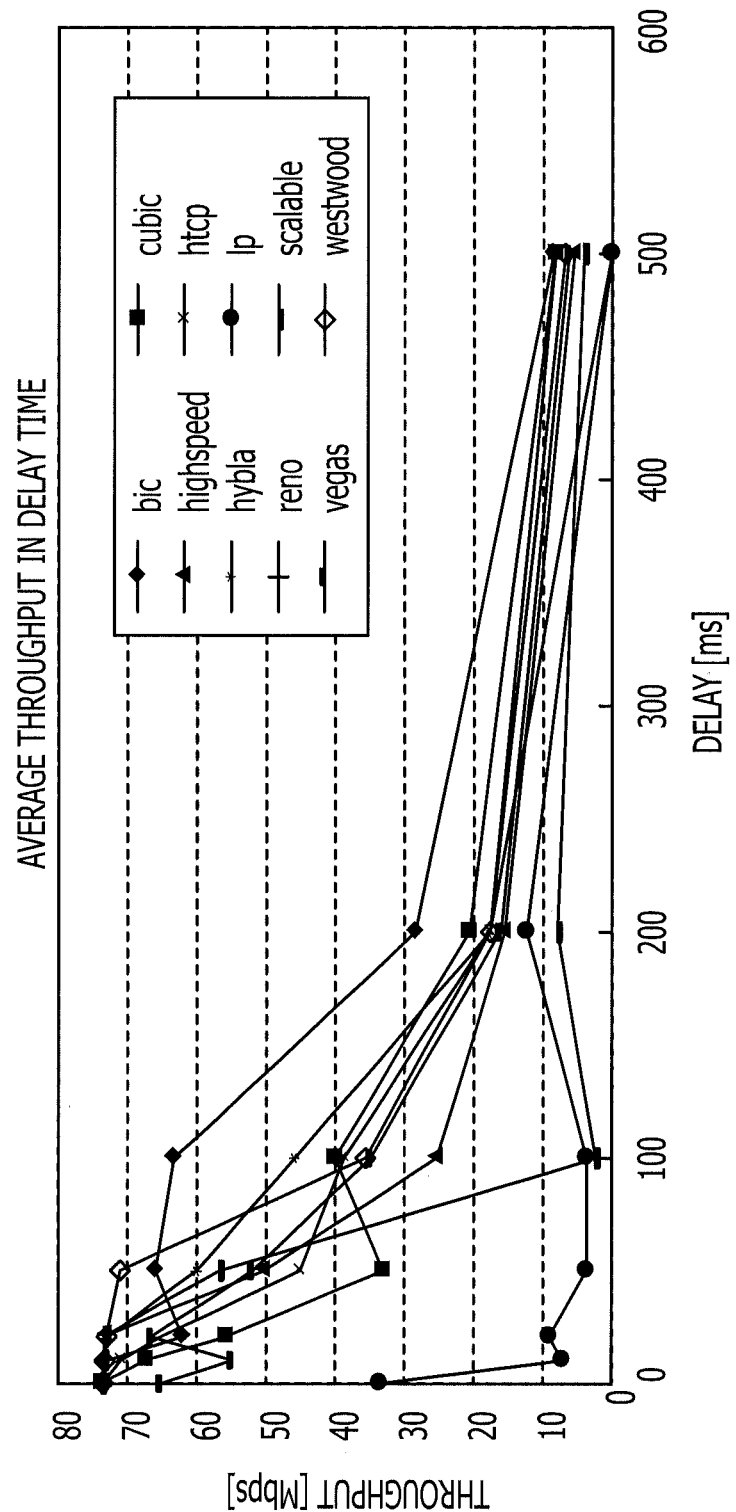

FIG. 19

|  |  | DATA TRANSFER TYPE | |
|---|---|---|---|
|  |  | BULK TRANSFER | TRANSACTION |
| COMPRESSION | YES | DEDUPLICATION | NO ACTION |
|  | NO | COMPRESSION AND DEDUPLICATION | COMPRESSION |

FIG. 20

| AVERAGE DISCARD RATE = SMALL | | TRAFFIC TYPE = BULK TRANSFER | | | TRAFFIC TYPE = TRANSACTION | | |
|---|---|---|---|---|---|---|---|
| | | AVERAGE DELAY SMALL | AVERAGE DELAY MEDIUM | AVERAGE DELAY LARGE | AVERAGE DELAY SMALL | AVERAGE DELAY MEDIUM | AVERAGE DELAY LARGE |
| AVERAGE BANDWIDTH VARIATION RATE | SMALL | Westwood | Westwood | BIC | BIC | BIC | CUBIC |
| | MEDIUM | BIC | htcp | Scalable | BIC | BIC | CUBIC |
| | LARGE | htcp | BIC | BIC | BIC | CUBIC | CUBIC |

| AVERAGE DISCARD RATE = MEDIUM | | TRAFFIC TYPE = BULK TRANSFER | | | TRAFFIC TYPE = TRANSACTION | | |
|---|---|---|---|---|---|---|---|
| | | AVERAGE DELAY SMALL | AVERAGE DELAY MEDIUM | AVERAGE DELAY LARGE | AVERAGE DELAY SMALL | AVERAGE DELAY MEDIUM | AVERAGE DELAY LARGE |
| AVERAGE BANDWIDTH VARIATION RATE | SMALL | Westwood | Westwood | BIC | BIC | BIC | CUBIC |
| | MEDIUM | Westwood | Htcp | Htcp | BIC | BIC | CUBIC |
| | LARGE | Scalable | htcp | htcp | BIC | CUBIC | CUBIC |

| AVERAGE DISCARD RATE = LARGE | | TRAFFIC TYPE = BULK TRANSFER | | | TRAFFIC TYPE = TRANSACTION | | |
|---|---|---|---|---|---|---|---|
| | | AVERAGE DELAY SMALL | AVERAGE DELAY MEDIUM | AVERAGE DELAY LARGE | AVERAGE DELAY SMALL | AVERAGE DELAY MEDIUM | AVERAGE DELAY LARGE |
| AVERAGE BANDWIDTH VARIATION RATE | SMALL | Scalable | Westwood | BIC | BIC | BIC | CUBIC |
| | MEDIUM | Westwood | Htcp | Htcp | BIC | BIC | CUBIC |
| | LARGE | Scalable | htcp | htcp | BIC | CUBIC | CUBIC |

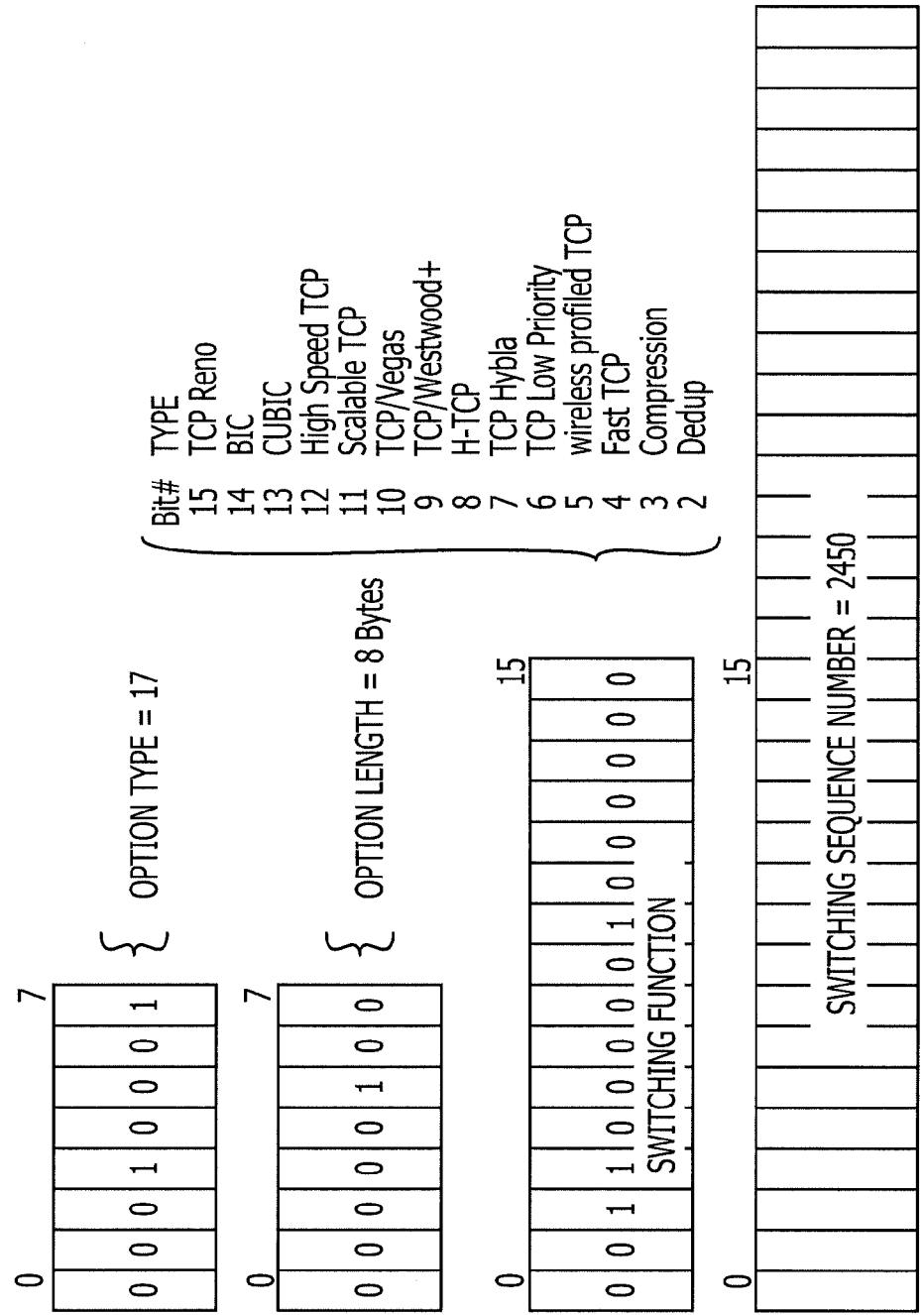

TRANSMISSION CONTROL METHOD, TRANSMISSION CONTROL SYSTEM, COMMUNICATION DEVICE AND RECORDING MEDIUM OF TRANSMISSION CONTROL PROGRAM

CROSS-REFERENCE TO RELATED APPLICATION

This application is based upon and claims the benefit of priority of the prior Japanese Patent Application No. 2011-037434, filed on Feb. 23, 2011, the entire contents of which are incorporated herein by reference.

FIELD

Embodiments discussed herein are related to a transmission control method, a transmission control system, a communication device, and a program for transmission control.

BACKGROUND

Recently, many communication applications use, as a de facto standard, a TCP (Transmission Control Protocol) protocol corresponding to a protocol of a transport layer in an OSI reference model, and there are various variations of the TCP protocol having different characteristics.

The Internet in recent years has continued to progress, for example, the speed the network and the distances covered by the network are increasing, and an LFN (Long Fat Network) and a wireless access network are becoming popular. An LFN has a problem in that in spite of having a wide bandwidth, sufficient performance is not exhibited because the TCP is applied between the communication devices, and a TCP that has been improved for LFNs has appeared. Furthermore, in the case of going through a wireless network, there is a problem in that throughput does not increase as a result of a packet error having occurred in the wireless network being recognized as congestion from the viewpoint of the TCP, and an improvement has been added to a TCP that deals with such a problem. As described above, the TCP protocol has repeatedly improved communication performance in response to the progress of network environments. As a result, various improved versions or variants, which have been specialized for a usage environment, exist.

SUMMARY

According to an aspect of the embodiments, a transmission control method includes performing communication between a transmission source communication device and a transmission destination communication device by using a transmission control protocol which includes a plurality of congestion control functions corresponding to a plurality of congestion control methods, respectively, and causing, when the transmission source communication device and the transmission destination communication device switch from a first congestion control function to a second congestion control function, at least one of a plurality of parameters for controlling operating states in the first congestion control function to be inherited by a parameter for controlling an operating state in the second congestion control function.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of an MCS;
FIG. 7 is a TCP option type table;
FIG. 9 is a protocol selection table;
FIG. 10 is a throughput characteristic diagram of each protocol with respect to a delay time period;
FIG. 19 is a function selection table;
FIG. 20 is a protocol selection table;
and
FIG. 21 illustrates a protocol switching request.

DESCRIPTION OF EMBODIMENTS

Figure 1:
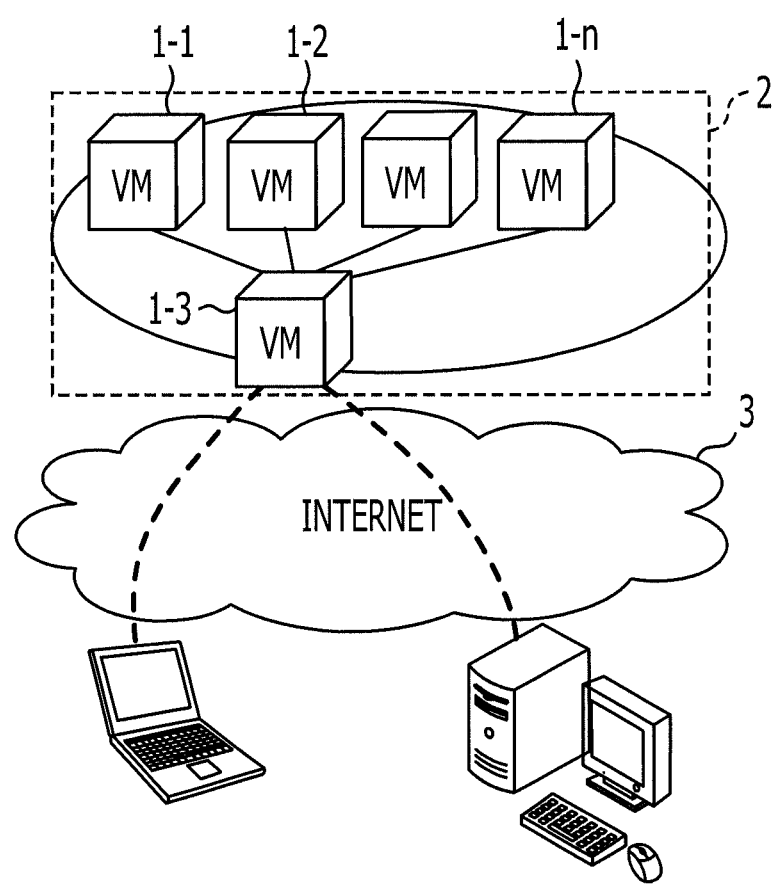
FIG. 1 illustrates cloud services.

Embodiments will be described below with reference to the drawings.

While inventing the present embodiments, observations were made regarding a related art. Such observations include the following, for example.

Various variations of the TCP protocol perform different congestion control operations. Congestion control is realized by combining a plurality of control technologies, such as window control, retransmission control, congestion notification, and the like, each variation thereof including a different function, for example. When individual control technologies that are combined are regarded as rules for performing congestion control, it may be said that congestion control operations realized by the variations differ in terms of a rule set in which several rules are used in combination.

In the various variations described above, for example, the window control method of TCP has been improved. The window control method may be broadly classified into two types: loss base methods and delay base methods.

(1) Loss Base Method

In a window control algorithm of TCP of a loss base method, control of a transfer amount is performed in accordance with a simple algorithm based on the assumption that the end node side is not aware of the state of the communication path. When congestion does not occur and a packet is not lost, it is assumed that there is a margin in the bandwidth of the network, and the congestion window size, which is a segment amount that may be continuously output, is increased to increase the transfer speed. In contrast, when congestion occurs and a packet is lost, the basic flow is that the congestion window size is decreased so as to decrease the transfer speed, so that congestion is avoided. By adjusting the transfer speed by repeatedly increasing/decreasing the congestion window size as described above, stabilized communication is performed. In order to perform stabilized communication, a certain amount of packet loss is assumed, and the state of the communication path is judged by using packet loss, which is a basic way of thinking.

In the loss base method, congestion is judged on the basis of a packet loss. If the loss base method is used in an environment like a wireless link, in which packet loss occurs even if there is no congestion, a state occurs in which there is not sufficient throughput although the bandwidth is more than sufficient. Furthermore, since the restoration after detection of congestion is aggressive, bandwidth change is dealt with comparatively early.

(2) Delay Base Method

The delay base method uses the following algorithm: the measured value (actually measured value) and the estimated value (calculated value) of an RTT (round trip time) in end to end is used. If the measured value falls below the estimated value, the bandwidth is assumed to be vacant, and the congestion window size is increased. If the measured value exceeds the estimated value, the bandwidth is assumed to be congested, and the congestion window size is decreased. For this reason, the bandwidth may be adjusted to an appropriate congestion window size before congestion occurs and the communication speed may be controlled. Consequently, packet loss is smaller than that in the loss base method, and it is possible to effectively use the bandwidth.

In the delay base method, the bandwidth may be used more effectively than in the loss base method. In an environment in which a delay is large like in a wireless line, if a change in the link bandwidth occurs frequently due to a change in an MCS (Modulation and Coding Scheme), throughput is maintained low. Furthermore, in an environment in which the RTT is large and the delay base method coexists with the loss base method, the delay base method competes with the loss base method and loses to the loss base method.

In addition to this, there is a device called a WAN acceleration device (WAN Optimizer). A pair of WAN acceleration devices is arranged between end terminals connected through a WAN, the TCP of the end terminals is temporarily terminated and reinstalled with a more optimized TCP, and the speed of proxy communication is increased. With regard to the above, a TCP that is tuned uniquely by a vendor is used among opposing WAN acceleration devices.

In practice, since a terminal is used in various environments, it is very difficult for only one kind of TCP scheme to have an optimal output performance under all the conditions. Accordingly, to deal with these problems, a technique of an auto tuning technology in the NET100 project has appeared. In this technique, the state of the line is checked before communication starts, and an optimum parameter and an optimum buffer amount for the TCP may be determined in accordance with the state.

On the other hand, in recent years, a TCP in which a loss base method and a delay base method are combined, which is called a hybrid method, has appeared. In the hybrid method, the loss base method and the delay base method may be separately used according to the environment. Consequently, it is possible to use the hybrid method to compensate for a decrease in throughput due to the competition with the loss base method, which is a drawback of the delay base method.

A technology is known in which when the transmission side BAS (Broadband Access Server) analyzes the content of an RTP packet and detects a preamble in the HDLC frame of image data, the transmission side BAS determines that the detection place is the start of the image data. Hereafter, the transmission side BAS performs protocol-conversion on the RTP packet so as to be converted into a TCP packet, and attaches tag information indicating this fact to the TCP packet. The receiving side BAS detects the TCP packet to which the tag information has been attached, deletes the tag information from the detected TCP packet, and performs a protocol conversion of returning the TCP format to an RTP format.

Furthermore, a technology is known in which a communication relay device detects characteristics of a flow in response to a network connection request from a communication terminal device, selects an optimal network corresponding to the characteristics of the flow, starts communication, updates, when the communication relay device detects that the selected network falls within the request quality of the flow, the corresponding item of the network of a network characteristic database, and selects the optimal network corresponding to the characteristics of the flow again.

Furthermore, a technology is known in which in a packet transfer device RT, communication traffic volume is monitored at a spot where packets belonging to networks NWa and NWb having different communication protocols merge in the same session, when congestion is detected when priority control of redirection transfer of a packet is performed, the sending source is notified with a congestion message from a congestion response server RSV, turnaround transfer of the packet is performed in the packet transfer device RT, direct communication is performed between client terminals TMa and TMb, a charging process with respect to a specific redirection is performed by collecting a communication log from the transferred packet and by storing it, and an address conversion process is performed to solve routing in the network of the redirection destination.

As an example of a hybrid method, there is a compound TCP (CTCP). As the circumstances in which the compound TCP has appeared, there is a problem of competition between the TCP protocol Reno of the loss base method and the TCP protocol Vegas of the delay base method. Because Vegas competes with Reno, New Reno, or the like, it is not possible to adjust an appropriate window size, and a decrease in throughput due to an increase in RTT and a decrease in the window size have been pointed out.

As described above, since Vegas is deprived of a bandwidth by Reno and New Reno, Vegas has a drawback that fair control is not performed. In order to compensate for this drawback, CTCP has functions of discriminating between the environments of the network and switching congestion control operations of the TCP protocols Vegas and New Reno, making it possible to avoid competition.

In the hybrid method, the TCP protocol Reno and the high-speed mode (High-Speed TCP) are switched between in accordance with the value of the measured RTT. In CTCP, two types of congestion windows of a loss mode and a delay mode are prepared; when the window in the loss mode overtakes the window in the delay mode, the two modes are switched between. In ARENO, the mechanism of the TCP protocol Westwood is extended, and continuous congestion window control is performed as a function of the RTT value. In CTCP and ARENO, when there is an available bandwidth for both of them, the congestion window is aggressively increased, and when the RTT increases, CTCP and ARENO behave as TCP-Reno, thereby realizing both throughput performance and compatibility.

In recent years, cloud services are becoming popular. The term "cloud services" refers to a form of computing in which, as illustrated in FIG. 1, a plurality of virtual machines (VM) 1-1 to 1-$n$, which are computing resources, are provided in a data center 2, and users use these virtual machines 1-1 to 1-$n$ through the Internet 3.

In such a style of use, there is a probability that the communication environment in end to end in the TCP communication greatly changes in the middle of communication. As one factor, as use of cloud services through the Internet 3, a style of use through a wireless access network, such as WiMAX (Worldwide Interoperability for Microwave Access) or LTE (Long Term Evolution), has been considered.

Figures 3A, 3B, 3C:
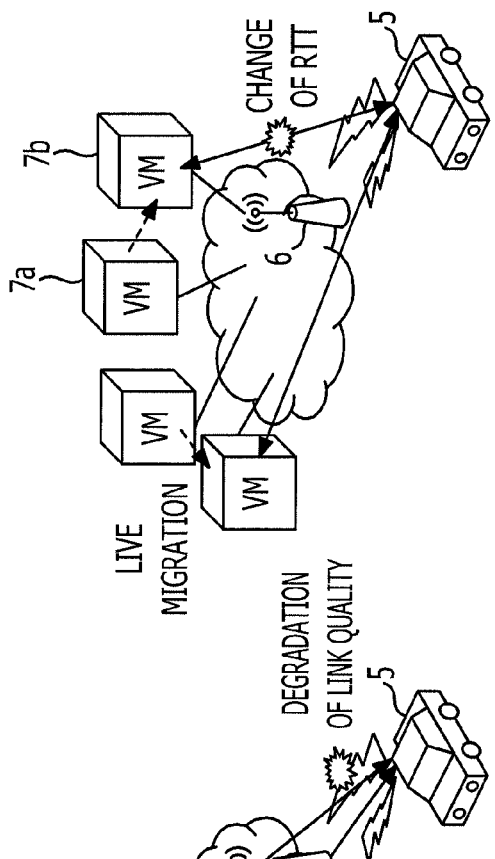
FIGS. 3A, 3B, and 3C illustrate a decrease in communication quality.

In recent digital wireless communication, an adaptive modulation method of OFDM (Orthogonal Frequency Division Multiplexing) is used, and a modulation method and a coding method are changed in accordance with the state of a radio wave. These are called MCS (Modulation Coding Scheme), and take various MCS values illustrated in FIG. 2 in response to the state of a radio wave between a base station and a terminal, and the theoretical data transfer rate of the physical layer continuously changes depending on the selected MCS. FIG. 3A illustrates a state in which digital wireless communication between a mobile terminal 5 and a wireless base station 6 has started. FIG. 3B illustrates a state in which the communication quality between the mobile terminal 5 and the wireless base station 6 has decreased. In the state of FIG. 3B, the data transfer rate has decreased. Furthermore, there is a probability that a terminal has been moving up until the present time will be brought indoors, and be used as a fixed terminal, or be changed to be able to perform stabilized communication as a result of being switched to operate with higher-speed WiFi (wireless fidelity).

The data center 3 that provides cloud services operates a plurality of virtual machines (VM) on a physical machine so as to provide hosting services of a virtual machine to customers. Another factor is that these virtual machines are likely to move from a certain physical machine to a physical machine in a completely different area. In cloud services, a function called live migration (LM) of moving a virtual machine from a certain physical machine to another physical machine is used for the purpose of maintenance. In this case, there is a case in which live migration is performed among physical machines in the same data center. Alternatively, there is a case in which, in order to deal with a disaster, a plurality of locations are provided in geographically separate data centers, and live migration is performed among the different locations. FIG. 3C illustrates a state in which an RTT has changed because a virtual machine that performs data transfer with the mobile terminal 5 performs live migration from 7$a$ to 7$b$.

The characteristics of the wireless data link layer may change from time to time. And, even if the terminal does not move in the wireless link, the physical machine of the data center may be moved. Thus, there is a probability that the RTT (round trip time) in end to end greatly changes in the middle of communication. Such a large change of the environment is difficult to be dealt with in the range of the parameter tuning of the TCP protocol. A higher throughput may be often obtained in a case where communication is performed by using a TCP protocol of a different version.

In the scheme of the auto tuning, a parameter and the buffer size in a specific TCP congestion control, method are dynamically updated in accordance with the state of the line. The TCP protocol itself is difficult to be changed. Even if the TCP protocol is optimal at first, when the characteristics of the data link layer and the position of the server are changed, and the environment changes to an environment, for example, a wireless environment, which is difficult to be dealt with by a loss base or by a rate base, a problem arises in that the optimum parameter that is determined at first is no longer optimum, and the throughput decreases.

Furthermore, in the TCP protocol of the hybrid method, it is possible for the TCP on the transmission side to switch between the loss base method and the delay base method. This only dynamically changes the window control algorithm on the transmission side, and there is a problem in that the effect obtained is limited. It is desired to deal with a scheme other than the window control algorithm on both the transmission side (data transmission side) and the receiving side (side that responds with an ACK). Examples of schemes other than the window control algorithm include, in order to adapt to the wireless environment, a scheme of SACK (selectable ACK) that decreases retransmission data in a control segment that is sent from the receiving side, and a scheme in which when a router in the middle of transmitting data packets is congested, congestion information is attached to the data packet so as to notify the receiving side of the congestion, and ECN (Explicit Congestion Notification), which is congestion information, is attached to the response ACK from the receiving side so as to notify the receiving side of the congestion.

Configuration of transmission control system

Figure 4:
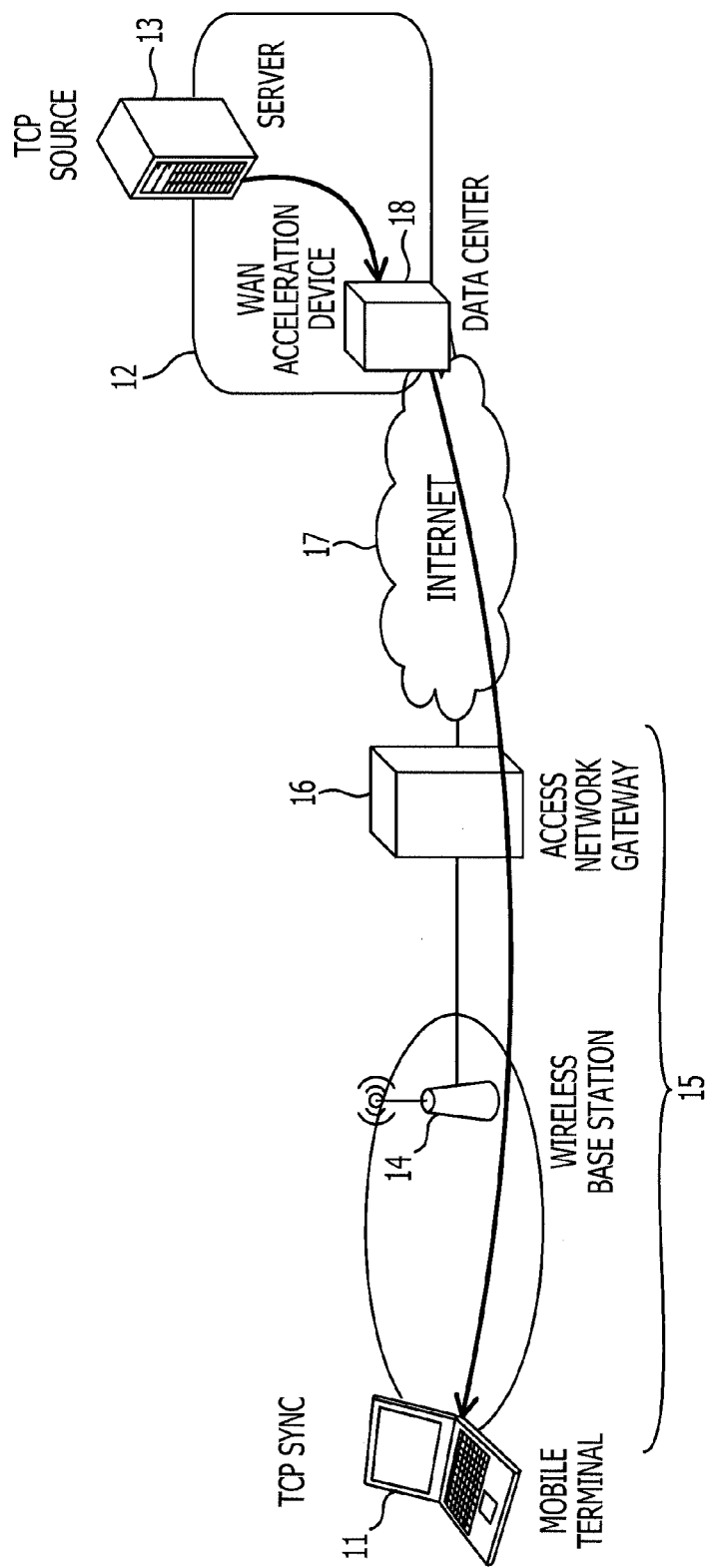
FIG. 4 is a block diagram of an embodiment of a transmission control system.

FIG. 4 is a block diagram of an embodiment of a transmission control system. It is assumed that, as illustrated in FIG. 4, a mobile terminal 11 performs TCP communication with a server 13 of a data center 12. The mobile terminal 11 is a wireless terminal including a wireless modem of WiMAX, is connected to a WiMAX wireless access network 15 through a wireless base station 14, is further connected to the Internet 17 through an access network gateway 16, and performs communication with the server 13 in the data center 12. Furthermore, it is assumed that a WAN acceleration device 18 is arranged at the connection point of the data center 12 and the Internet 17 and that the mobile terminal 11 has been installed in advance with a virtual WAN acceleration appliance corresponding to the mobile terminal 11.

The virtual WAN acceleration appliance is configured in such a manner that a virtual machine environment is constructed on the OS (host OS) of the mobile terminal 11, a guest OS is made to run thereon, and the function of the WAN acceleration appliance as software is realized on the guest OS. When the application (the application on the host OS) in the mobile terminal 11 performs communication, transmission and reception are performed through the virtual WAN acceleration appliance on the guest OS. At this time, the virtual WAN acceleration appliance provides the function of terminating the TCP of the terminal by using the proxy function and is reinstalled into an optimized TCP.

Each configuration of the mobile terminal 11, the server 13, and the WAN acceleration device 18, may include, for example, a processor and a memory storing a program executed by the processor. And, each function of the mobile terminal 11, the server 13, and the WAN acceleration device 18 may be performed, for example, by the processor executing the program stored in the memory. The each function of the mobile terminal 11, the server 13, and the WAN acceleration device 18 may include the function of the WAN acceleration appliance. Parameters used for the function of the WAN acceleration appliance may be stored in a memory of the each configuration of the mobile terminal 11, the server 13, and the WAN acceleration device 18.

Here, it is assumed that the mobile terminal 11 has downloaded a file from the server 13 in accordance with an FTP (File Transfer Protocol). The WAN acceleration device 18 acts as a proxy so as to temporarily end the TCP session between the server and the mobile terminal 11, and performs communication with the virtual WAN acceleration appliance in the mobile terminal 11 by using the optimized TCP protocol. The virtual WAN acceleration appliance in the mobile terminal 11 ends the optimized TCP protocol by acting as a proxy again, and transmits data to the application in the terminal by using the standard TCP. At this time, the proxy and the application that receives data are in the same terminal. Furthermore, the WAN acceleration device 18 provides a function of compression of data included in the TCP and a function called deduplication such that the same data will not be sent two or more times by caching it.

First Embodiment

Figure 5:
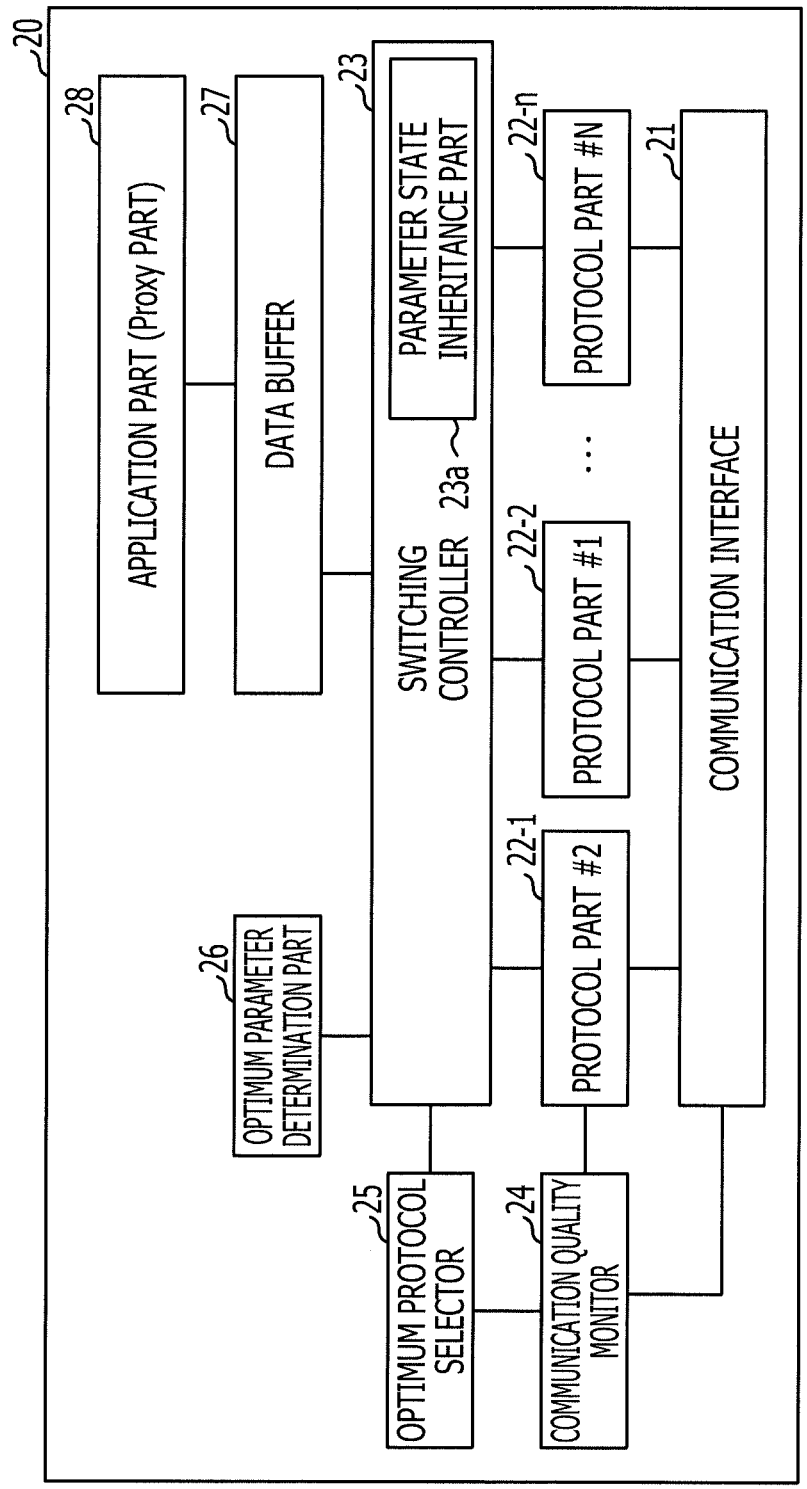
FIG. 5 is a block diagram of a first embodiment of a communication device.

FIG. 5 is a block diagram of a first embodiment of a communication device. A communication device 20 illustrated in FIG. 5 indicates a WAN acceleration device 18 or a virtual WAN acceleration appliance in the mobile terminal 11. The communication device 20 includes a communication interface 21, protocol parts 22-1 to 22-n, a switching controller 23, a communication quality monitor 24, an optimum protocol selector 25, an optimum parameter determination part 26, a data buffer 27, and an application part 28.

The communication interface 21 is a processing unit that receives or transmits packets from or to a connected network.

The protocol parts 22-1 to 22-n are processing units that perform a congestion control process in which a congestion control function (rule set) of different congestion control operations is used. For example, the protocol part 22-1 performs a process of Reno, which is a variant of TCP, and the protocol part 22-2 performs a process of BIC, which is another variant of TCP.

The switching controller 23 is a processing unit that, when the optimum protocol selector 25 determines that switching of the protocol is desired, exchanges control messages with an opposing device, and that switches the protocol while achieving synchronization. A parameter state inheritance part 23a in the switching controller 23 performs inheritance of parameters including the states of the protocol parts 22-1 to 22-n.

The communication quality monitor 24 is a processing unit that monitors the communication quality of the data link layer and the protocol part 22.

The optimum protocol selector 25 is a processing unit that selects an optimal transport layer protocol on the basis of the data link layer information collected by the communication quality monitor 24 and the quality information obtained by the protocol part 22 by performing communication with the opposing device.

The optimum parameter determination part 26 is a processing unit that determines the optimum initial value of the previous parameter of the protocol part 22 with respect to the protocol to be switched next, which has been selected by the optimum protocol selector 25, and of the parameter after the state is inherited and switched.

The data buffer 27 is a memory for temporarily storing the data for which the application requested the transmission when the protocol parts 22-1 to 22-n transfer data to another party communication device. Also, the data buffer is a memory for temporarily storing data until the application has finished receiving the data when the protocol parts 22-1 to 22-n have received the data from the other party communication device.

The application part 28 is an application part that performs communication by using the transport layer protocol. When the communication device is a WAN acceleration device 18 or a virtual WAN acceleration appliance, the application part 28 becomes a process for acting as a proxy.

Operation

A description will be given below, with reference to the operation sequence illustrated in FIG. 6, of the operation of the first embodiment between the WAN acceleration device 18 and the virtual WAN acceleration appliance in the mobile terminal 11. In the following, the virtual WAN acceleration appliance in the terminal will be referred to as a TWO (terminal-side WAN-Optimizer), and the WAN acceleration appliance on the server side will be referred to as an SWO (server side WAN-Optimizer).

In the present embodiment, a case is assumed in which a file is transferred from the server to a mobile terminal in accordance with an FTP. In the FTP, a file transfer is performed by using a TCP session (port #21) for control and a TCP session (port #20) for data transfer. The procedure thereof is as follows. (1) A session request is transmitted from the TWO that is a client to the port #21 of the SWO that is an FTP server, so that a session is established and a log-in is made. (2) A file transfer request is transmitted from the client, and a permission is given from the server. (3) The client transmits the port number used by itself to the server, and the communication in the control port is completed. (4) The server uses the data transmission port #20 for the port number obtained from the client so as to establish a session. (5) The server transfers the requested file, and closes the session.

In general, there are two types of modes depending on which of the server and the terminal the session for data transfer is established for. One of the modes is an active mode in which a session for data transfer is created from the server to the terminal. The other mode is a passive mode in which a session for data transfer is created from the terminal to the server. In the following example, operations in the session for data transfer in the active mode will be described.

First, in each of the TWO and the SWO, variants of various TCP protocols, that is, protocol parts 22-1 to 22-n, are placed in an internally usable state (operations S1 and S52).

In the FTP control session, when the TWO gives an instruction of transferring data from the server to the terminal in the active mode, the TWO opens a port in order to accept a session for data transfer and waits for a connection from the server. In order to open the port, the TWO performs system calls of Socket, Bind, and Listen (operation S2).

When the SWO receives the data transfer instruction in the active mode in the FTP control session, the SWO opens the port and starts a session for data transfer. After the SWO performs the system calls of Socket and Bind and opens the port in order to start the session, the SWO performs a Connect system call (operation S53). The SWO transmits a Syn packet to the terminal by performing the Connect system call.

When the TWO receives the connection request (Syn) from the server, the TWO accepts this request (Accept, operation S3). Upon acceptance, the TWO sends a response (ACK) to the SWO, and the SWO transmits Syn/ACK in response to this (operation S54), three-way handshake (3wayhandshake) of TCP is completed, and a session is created.

Figure 8:
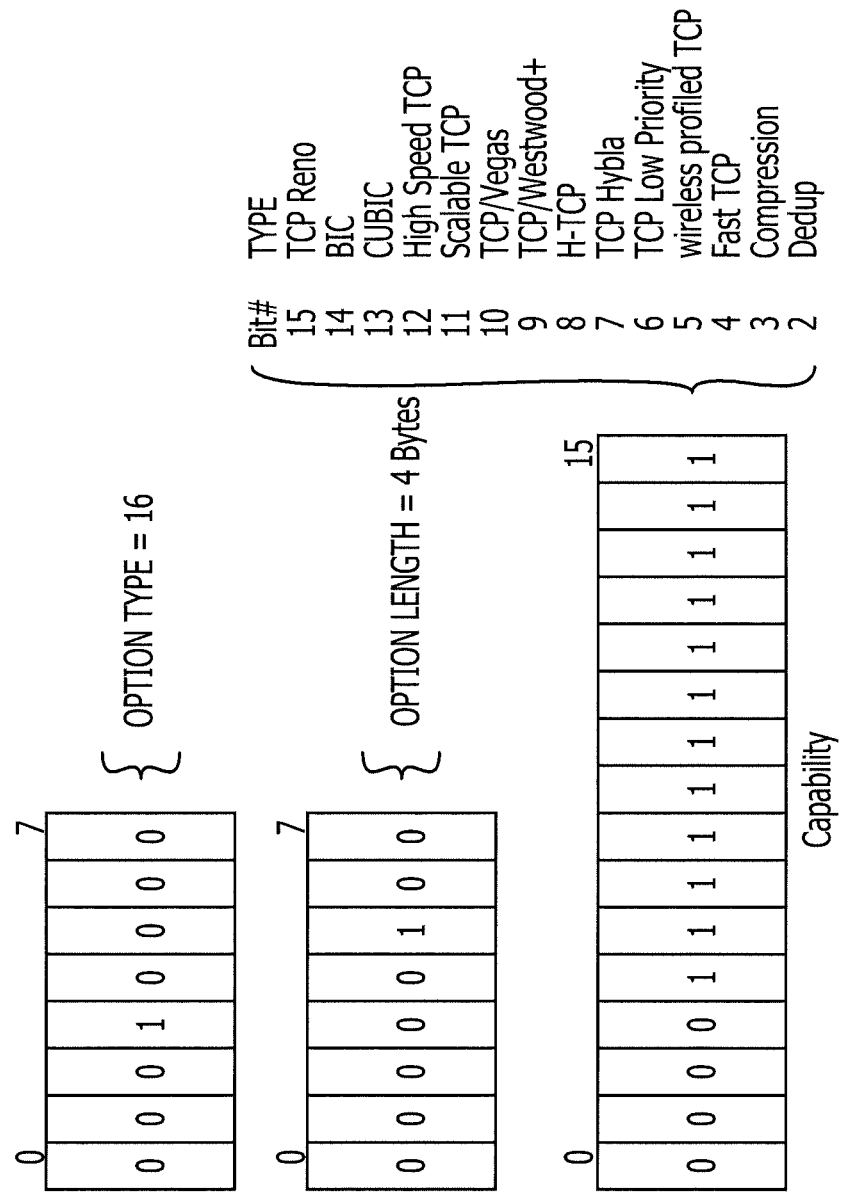
FIG. 8 illustrates an adaptive protocol capability option.

When the first Syn and the next ACK are to be transmitted, the SWO and the TWO exchange capability indicating which kind of TCP protocol both of them may use by using a TCP option field. At this time, the SWO, which is a side that starts the session, specifies "16" indicating an adaptive protocol capability option as an option type on the basis of a TCP option type table illustrated in FIG. 7. FIG. 8 illustrates an adaptive protocol capability option. The adaptive protocol capability option includes an option type "16" of 1 byte, an option length of 1 byte, and capability bits of 2 bytes. Furthermore, 1 is set to bits within the capability bits indicating a protocol that is usable in the SWO. When a plurality of protocols may be used, a plurality of bits are set.

The TWO receiving the Syn message including the TCP option=16 includes the TCP option=16 in the ACK message, sets only the bits within the capability of the TCP protocol specified as the capability by the SWO, which may be used by the TWO, and transmits the data. In the present embodiment, an option field of the TCP is used to exchange the capability. Alternatively, another field including a data area may be used, or another message may be used to exchange the capability.

The SWO starts data transmission in response to the application performing a write system call. The data written in a socket buffer in accordance with the write system call is transmitted to the TWO in units of segments in accordance with the TCP protocol (operation S56). At this time, it is assumed that the SWO and the TWO use Reno as the default TCP protocol and may newly define the default TCP option so as to mutually decide which TCP protocol is started.

The SWO starts data transfer by using the default TCP protocol (=Reno) (operation S56). At this time, the SWO and the TWO perform communication by using the protocol part 22-1 of Reno. When the TWO receives a TCP segment, the TWO stores the data in the socket buffer of the TWO, and notifies the application part of the arrival of the data. The application part reads the data from the socket buffer by using the read system call (operation S4). Here, the communication quality monitor 24 of the TWO monitors the rate of discard, such as a change of the bandwidth in which the data link layer has been assigned, a bit error rate, or a packet error rate, and also monitors a round trip time that may be monitored by each protocol part. Specifically, the change in the bandwidth may be defined as in the following.

Average bandwidth rate of change=$\Sigma \ln \{X(t+1)/X(t)\}$

When a change in the data link layer quality or a change in the communication quality of the round trip time exceeds a threshold value, the communication quality monitor 24 of the TWO notifies the optimum protocol selector 25 of the excess. For example, when at least one of the change amount of the delay (round trip time), the bandwidth, and the rate of discard exceeds a certain threshold value, the communication quality monitor 24 may notify the optimum protocol selector 25 of the change of the communication quality. Furthermore, when the throughput (data transfer speed) after passing through the transport layer becomes a threshold value (for example, ½ of the bandwidth of the data link layer) by using the bandwidth that has been assigned to the data link layer by the MCS as a reference, the communication quality monitor 24 may notify the optimum protocol selector 25 of the change of the communication quality.

Upon receiving the notification, the optimum protocol selector 25 determines that a switch is made to a TCP protocol appropriate for the state of the change. For example, the optimum protocol selector 25 may select a TCP protocol to be used on the basis of a protocol selection table illustrated in FIG. 9. In FIG. 9, the average rate of discard is divided into three levels, and in each level of the average rate of discard, a TCP protocol Reno, Westwood, BIC, htcp or scalable is set on the basis of the average bandwidth rate of change at three levels and the average delay time period at three levels.

Figure 11:
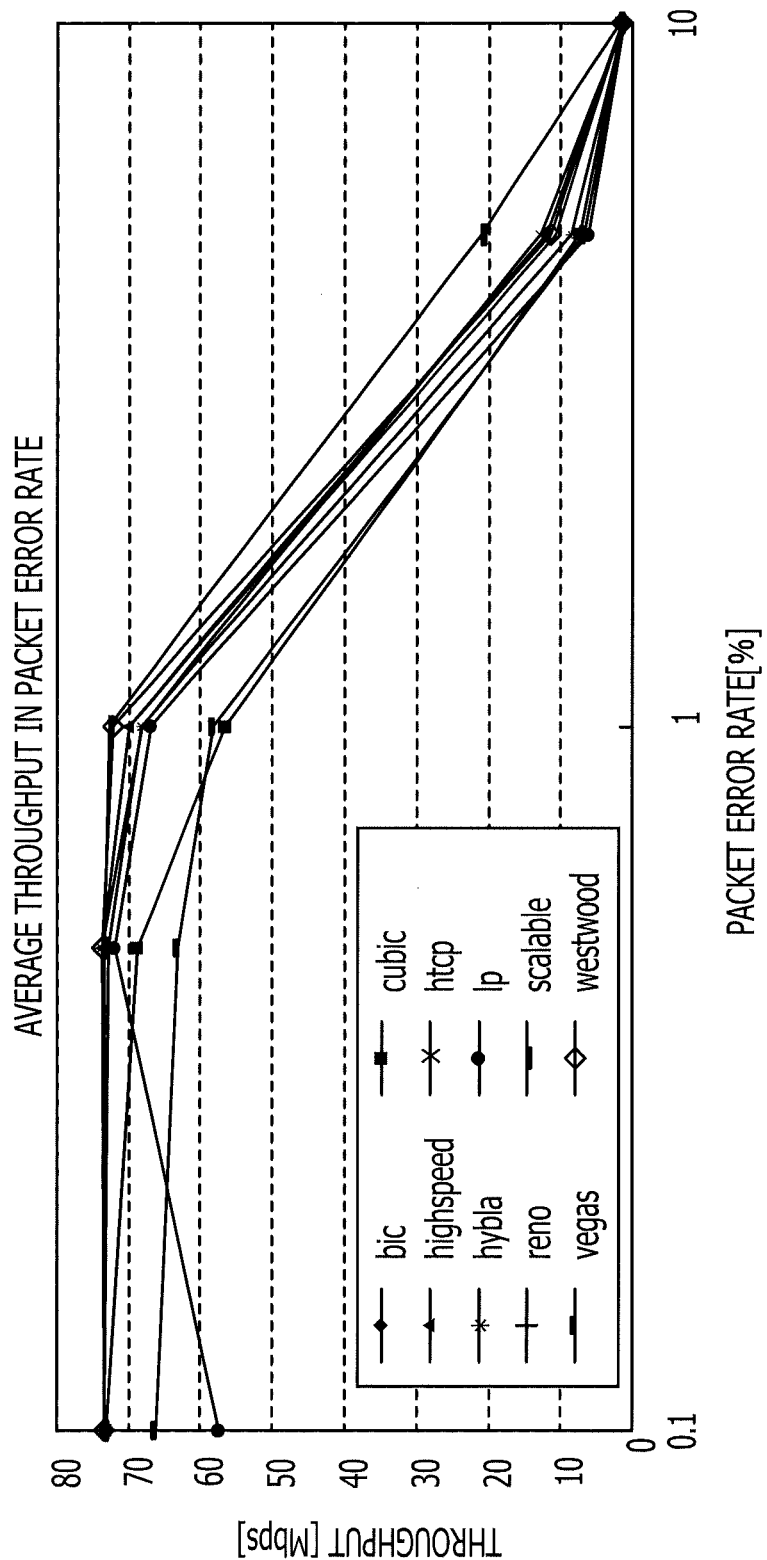
FIG. 11 is a throughput characteristic diagram of each protocol with respect to a packet error rate.

The protocol selection table of FIG. 9 may be created statically on the basis of characteristic evaluations of various protocols, such as the throughput characteristics of each protocol with respect to the delay time period illustrated in FIG. 10, or the throughput characteristics of each protocol with respect to the packet error rate (rate of discard) illustrated in FIG. 11. Furthermore, each time the mobile terminal or the server performs communication, throughput may be dynamically measured, and the protocol selection table may be formed dynamically.

Furthermore, in FIG. 10 and FIG. 11, evaluation centers on throughput. Alternatively, a protocol selection table may be formed which centers on an index other than the throughput of a single session, such as fairness among sessions under an environment in which a plurality of TCP sessions exist, or total throughput as the whole of a plurality of sessions. The term "fairness" refers to that, when a plurality of TCP sessions exist, a bandwidth for which a network may be used is shared equally with the other sessions, and the fairness differs depending on which protocol is used.

Figure 6:
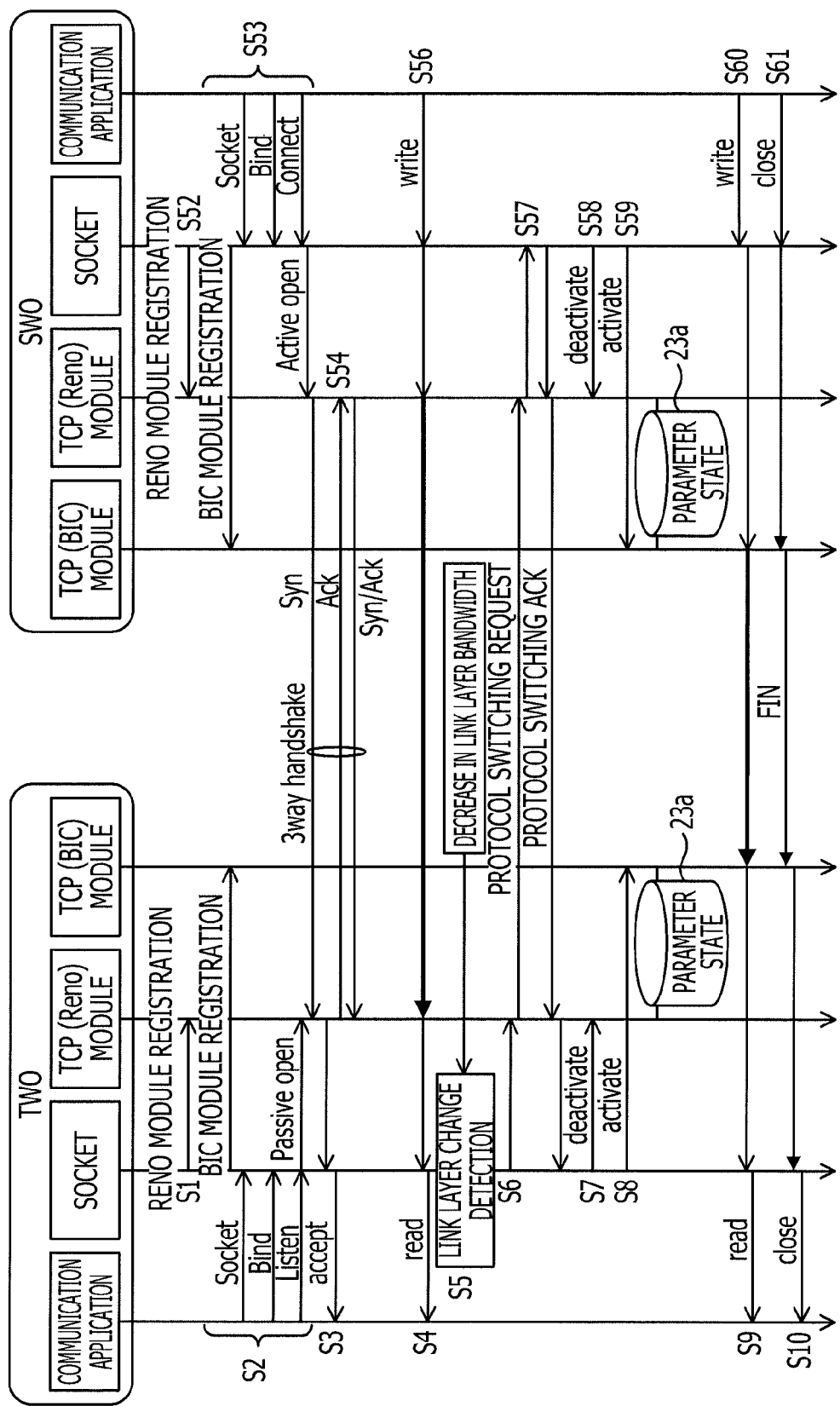
FIG. 6 illustrates an operation sequence of the first embodiment.
Figure 12:
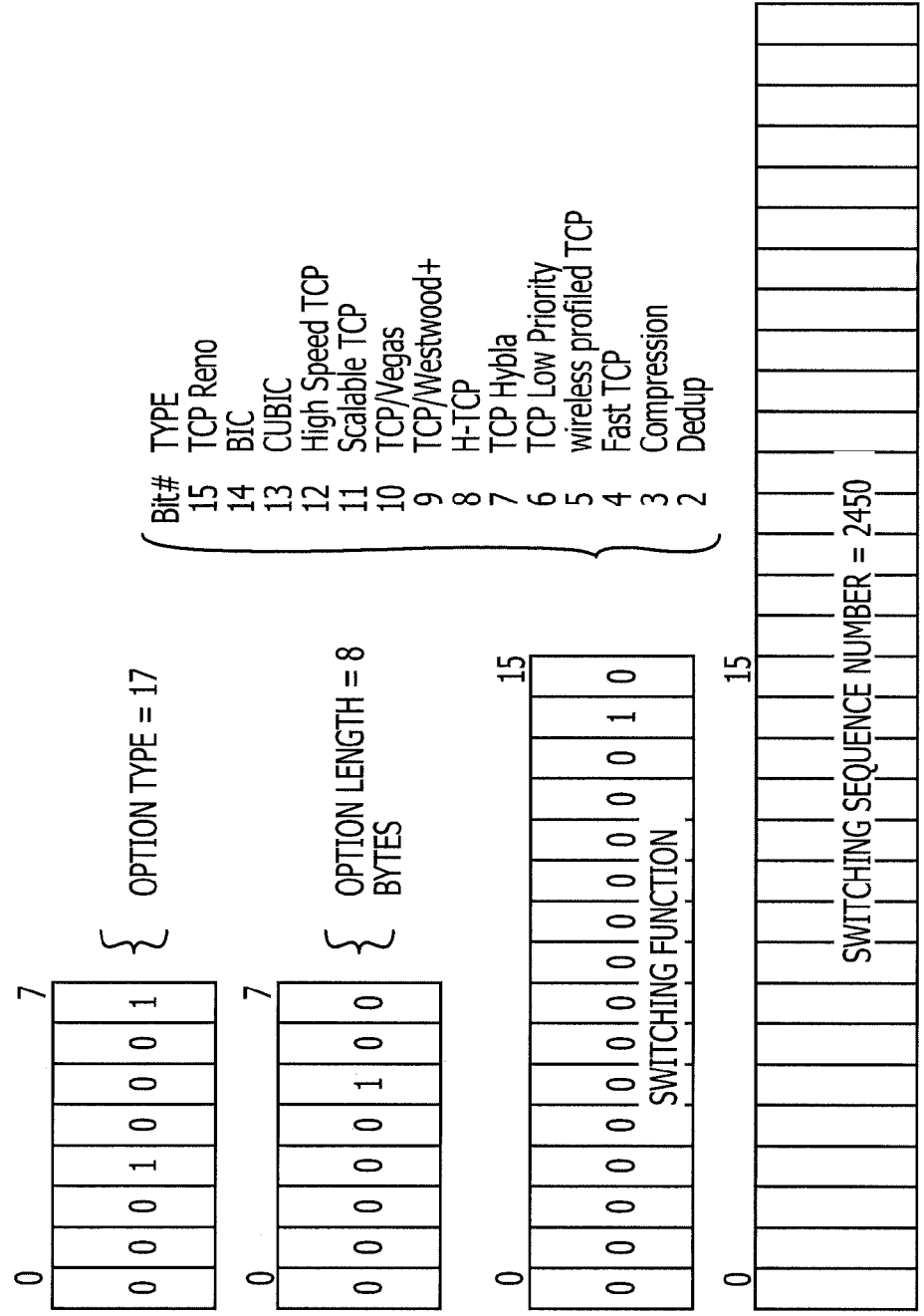
FIG. 12 illustrates a protocol switching request.

Here, when the mobile terminal 11 is moved and the TWO detects a decrease in the quality of the data link layer (operation S5), the TWO specifies a protocol switching request illustrated in FIG. 12 in the TCP option, and transmits the data (operation S6 in FIG. 6). The present message may be transmitted together with an ACK and data. FIG. 12 illustrates a protocol switching request. The protocol switching request has an option type "17" of 1 byte, an option length of 1 byte, switching function bits of 2 bytes, and a switching sequence number of 4 bytes.

When the SWO receives the protocol switching request, the SWO specifies the protocol switching ACK in the TCP option field, and transmits it. The protocol switching ACK includes the same content as that of the protocol switching request, and is transmitted with an option type=18 (operation S57). In the present embodiment, the option fields of the TCP are used as the protocol switching request and the protocol switching ACK. Alternatively, another field including a data area may be used, and another message may be used.

The SWO and the TWO perform switching between protocols at the switching sequence number included in the protocol switching request. When the SWO finishes receiving an ACK for the message of the negotiated switching sequence number from the TWO, the SWO switches to a new protocol specified in the switching function field of the protocol switching request. At this time, the TWO transmits an ACK including, for example, the reception window size=0, thereby temporarily stopping the data transmission of the SWO. Thereafter, the TWO performs switching between protocols, and restarts communication after the protocols are switched, so that a problem may be avoided from occurring in the data communication at the time of the switching of the protocol.

The switching of the protocols causes a Deactivate signal to be sent to the existing protocol part (operations S58 and S7) and causes an Activate signal to be sent to the new protocol part (operations S59 and S8). At this time, the parameter including the state held by the previous protocol is transferred to a new protocol. In particular, the TCP on the transmission side has a plurality of states such as a slow start and a congestion avoidance mode. Each TCP protocol differs in its congestion control method depending on this state. Accordingly, inheritance of a plurality of parameters for controlling the operating state, such as a congestion window size cwnd including this state, a threshold value ssthresh, and a window size Wmax, is important for the new TCP protocol to start from an appropriate state.

Furthermore, the TCP protocol has parameters of the congestion window size cwnd indicating at which window size data is currently being transmitted, and a threshold value ssthresh that is one of the parameters used to determine to which degree the congestion window size cwnd is decreased when congestion is detected. Furthermore, a window size Wmax when congestion is detected, a minimum value RTTmin and a maximum value RTTmax of the round trip time, a delay-bandwidth product, and the like are inherited as parameters. The delay-bandwidth product is the amount represented by the product of the bandwidth of the network and the round trip time, and is a value that determines the upper limit value of the approximate transmission rate of the TCP. In the case that a switch is made to a new TCP protocol, when the TCP protocol starts from the slow start, a loss in throughput occurs. Therefore, in the new protocol, these parameters are used to calculate the congestion window size cwnd so that the TCP protocol starts from the slow start.

Figure 13:
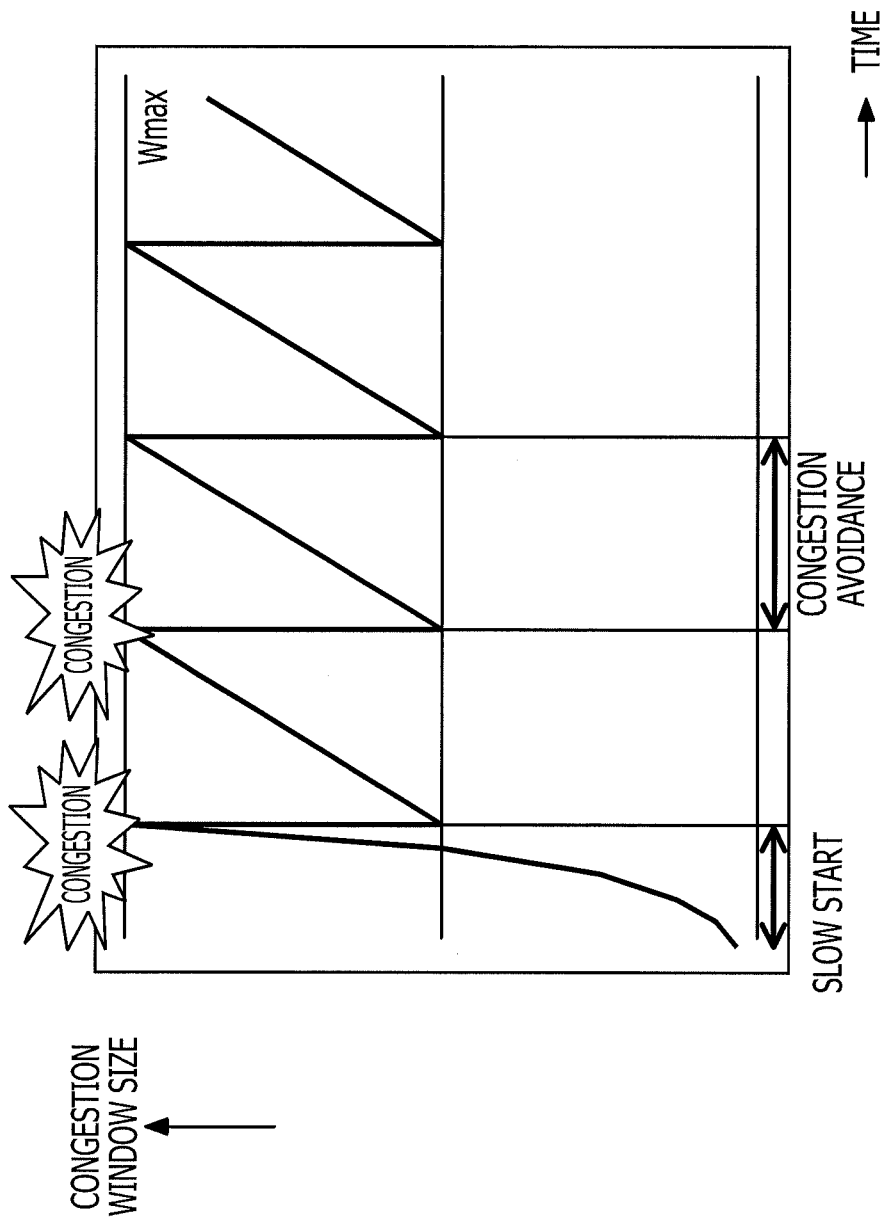
FIG. 13 illustrates congestion control of Reno.

For example, in the TCP protocol Reno, congestion control illustrated in FIG. 13 is performed. That is, in the period of the slow start, the congestion window size is increased in the manner of an exponentiation function from the initial value. The congestion window size cwnd when congestion is detected is set to the window size Wmax, ½ of the congestion window size cwnd is set to the threshold value ssthresh, and the congestion window size cwnd is set to the threshold value ssthresh. After that, congestion avoidance such that the congestion window size cwnd is increased linearly until congestion is detected is performed.

Figure 14:
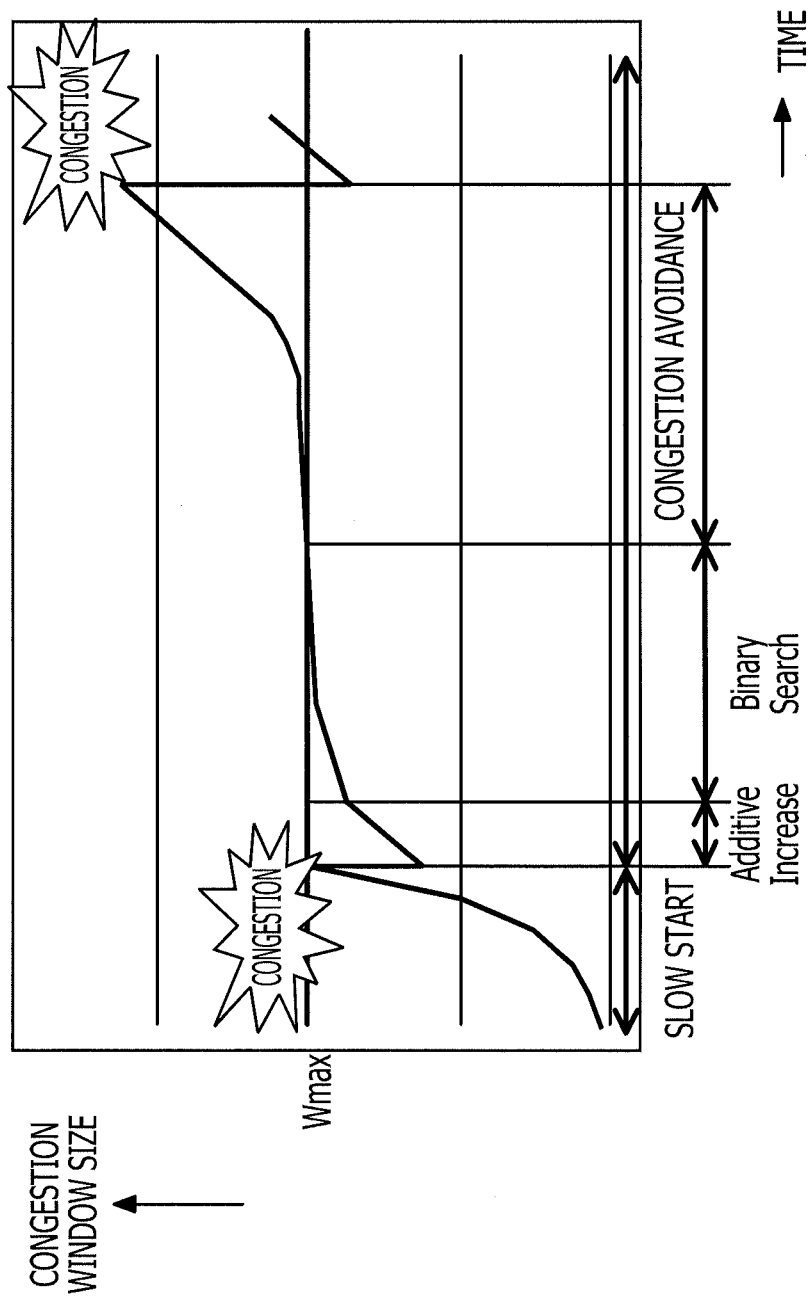
FIG. 14 illustrates congestion control of BIC.

On the other hand, in a TCP protocol BIC, congestion control illustrated in FIG. 14 is performed. More specifically, in the period of the slow start, the congestion window size is increased in the manner of an exponentiation function from the initial value. The congestion window size cwnd when congestion is detected is set to the window size Wmax, and the congestion window size cwnd is multiplied by a certain coefficient β to set a new congestion window size cwnd. After that, the congestion window size cwnd is increased linearly (Additive Increase), and furthermore, the congestion window size cwnd is made to gradually approach the window size Wmax (Binary Search). Then, if congestion is not detected, congestion avoidance such that the congestion window size cwnd is increased linearly is performed.

Figure 15:
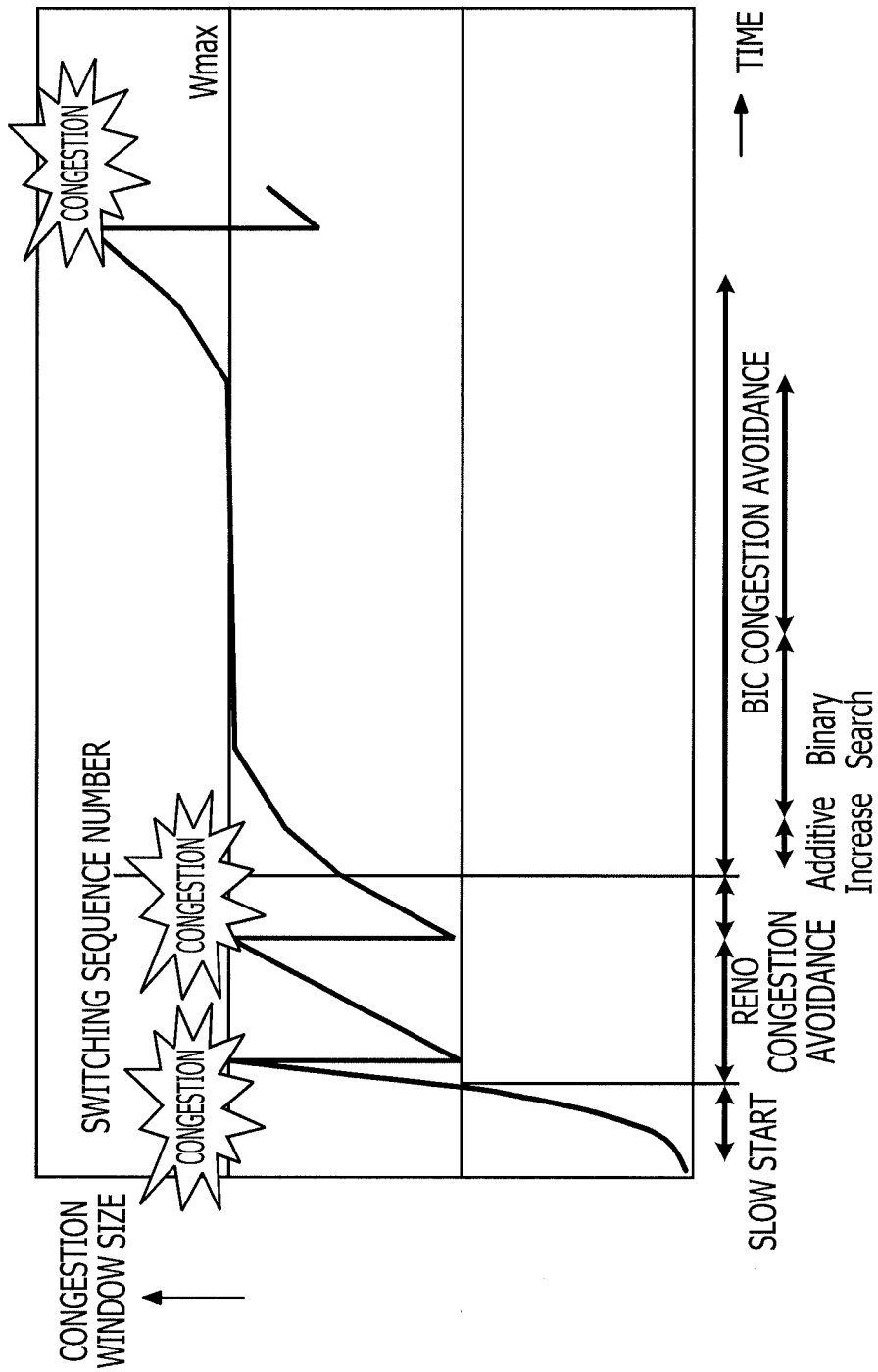
FIG. 15 illustrates congestion control of the first embodiment.

In the present embodiment, when, for example, a switch is made from the TCP protocol Reno to the TCP protocol BIC, as illustrated in FIG. 15, before the switching sequence number, the congestion control of TCP-Reno is performed, and after the switching sequence number, a switch is made to the control in accordance with the TCP protocol BIC. At the time of the switching, the BIC inherits the final state of Reno, that is, parameters, such as the congestion avoidance mode, the congestion window size cwnd, the window size Wmax, and the threshold value ssthresh, and performs congestion avoidance without starting from the slow start. The inheritance of the parameters including the states is performed by a parameter state inheritance part 23a illustrated in FIGS. 5 and 6.

When the protocols are switched, hereafter, the data that has not been transmitted, which remains in the socket buffer on the transmission side, and the data that is hereafter written from the application part to the transmission buffer, are transmitted and received by using the new protocol (operations S60 and S9).

When the application part of the SWO finishes transmitting all the data, the application part closes the socket and disconnects the session (operations S61 and S10).

In the foregoing, in the present embodiment, a case has been described in which a switch is made from the TCP protocol Reno to the TCP protocol BIC. However, the variants of the TCP are not limited to this, and may be used to switch to another variant, such as Wireless Profiled TCP. Furthermore, the TCP protocol Reno and the TCP protocol BIC have been described like respectively independent modules. However, these are not necessarily to be mounted as separated configurations, and may be mounted as monolithic kernel functions and may be switched by option.

Second Embodiment

In the first embodiment, a case has been described in which the protocols on the transmission side and the receiving side are adaptively changed in accordance with environmental changes. Not limited to changing a protocol, functions of compression and cache may be adaptively changed. In a second embodiment given below, a WEB application rather than an FTP is assumed.

Figure 16:
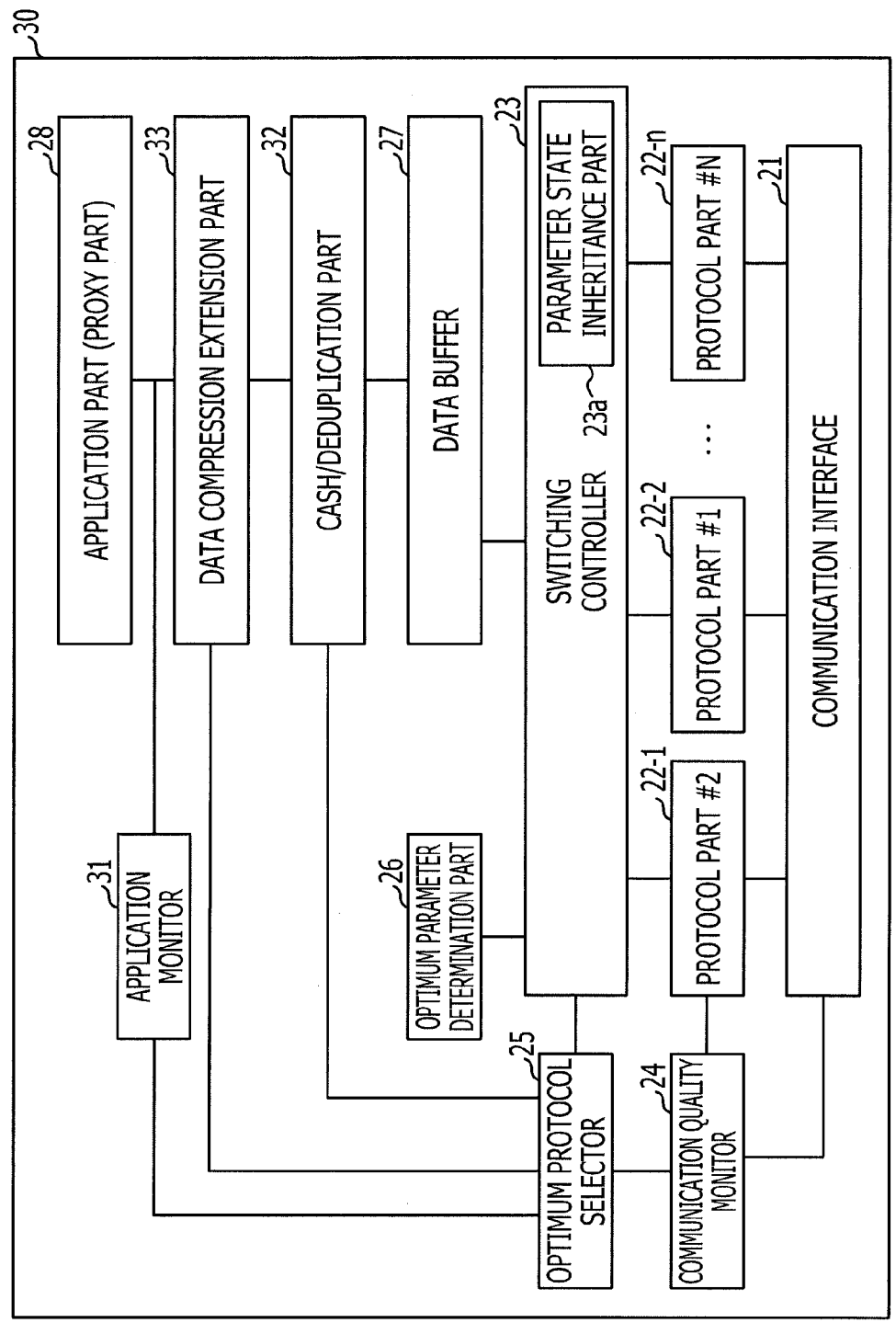
FIG. 16 is a block diagram of a second embodiment of a communication device.

FIG. 16 is a block diagram of the second embodiment of a communication device. The components in FIG. 16, which are the same as those of FIG. 5, are designated with the same reference numerals. A communication device 30 illustrated in FIG. 16 indicates the WAN acceleration device 18 or a virtual WAN acceleration appliance in the mobile terminal 11. The communication device 30 includes a communication interface 21, protocol parts 22-1 to 22-n, a switching controller 23, a communication quality monitor 24, an optimum protocol selector 25, an optimum parameter determination part 26, a data buffer 27, an application part 28, an application monitor 31, a cache/deduplication part 32, and a data compression and decompression part 33.

The communication interface 21 is a processing unit that receives or transmits packets from or to a connected network.

The protocol parts 22-1 to 22-n are processing units that perform a congestion control process in which a different rule set of congestion control is used. For example, the protocol part 22-1 performs the process of Reno, which is a variant of the TCP, and the protocol part 22-1 performs the process of the BIC, which is another variant of the TCP.

The switching controller 23 is a processing unit that, when the optimum protocol selector 25 determines that the switching of the protocols is desired, exchanges control messages with an opposing device and switches the protocols while achieving synchronization. The parameter state inheritance part 23a in the switching controller 23 performs inheritance of parameters including states among the protocol parts 22-1 to 22-n.

The communication quality monitor 24 is a processing unit that monitors the communication quality of the data link layer and the protocol part 22.

The optimum protocol selector 25 is a processing unit that selects an optimal transport layer protocol on the basis of the data link layer information collected by the communication quality monitor 24 and the quality information obtained by performing communication with the opposing device by the protocol part 22.

The optimum parameter determination part 26 is a processing unit that determines, with respect to the protocol scheduled to be switched next, the protocol being selected by the optimum protocol selector 25, an optimum initial value of a parameter after parameters including the previous state of the protocol part 22 are inherited and switched.

The data buffer 27 is a memory that temporarily stores the data for which the application has requested for transmission when the protocol parts 22-1 to 22-n transfer data to another party communication device. The data buffer 27 is also a memory that temporarily stores, when the protocol parts 22-1 to 22-n receive data from the other party communication device, the data until the application has finished receiving the data.

The application part 28 is an application part that performs communication by using the transport layer protocol. When the communication device is the WAN acceleration device 18 or a virtual WAN acceleration appliance, the application part 28 becomes a process that acts as a proxy.

The application monitor 31 is a processing unit that monitors a data stream transmitted by the application part 28 and identifies the characteristics of the application part, and is also a processing unit that detects whether the content of the data has already been compressed, and detects whether the data transfer is a session of a type in which a sporadic data transfer is performed for transaction or a session of a type in which bulk data transfer is performed.

The cache/deduplication part 32 caches the data written to the data buffer 27 by the application part 28 and attaches an index to the cached data. Furthermore, the cache/deduplication part 32 is a processing unit that refers to, when an index is passed from the opposing device, the cached data corresponding to the index so as to restore the original data.

The data compression and decompression part 33 is a processing unit that compresses the data written by the application part 28 and that decompresses the data when the data compressed by the opposing device is received.

Operation

Figure 17:
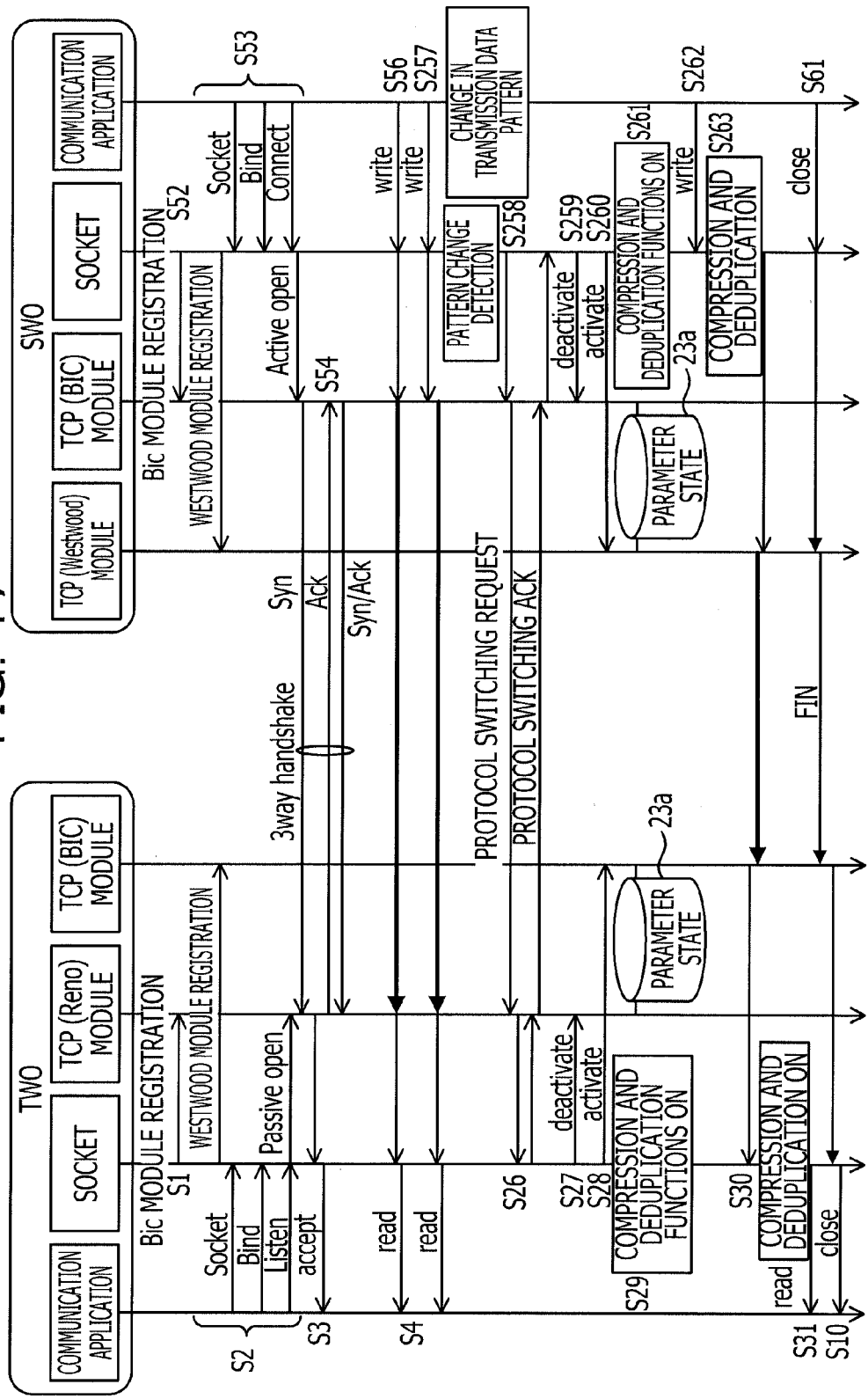
FIG. 17 illustrates an operation sequence of the second embodiment.

A description will be given below, with reference to the operation sequence illustrated in FIG. 17, of the operation of the second embodiment between the WAN acceleration device 18 and the virtual WAN acceleration appliance in the mobile terminal 11. The operations (operations S52 to S56, operations S2 to S4) until the TWO and the SWO perform communication in accordance with a first protocol, and the communication ending operation (operations S61 and S10) are the same as those of the first embodiment, and thus the descriptions thereof are omitted.

Figure 18:
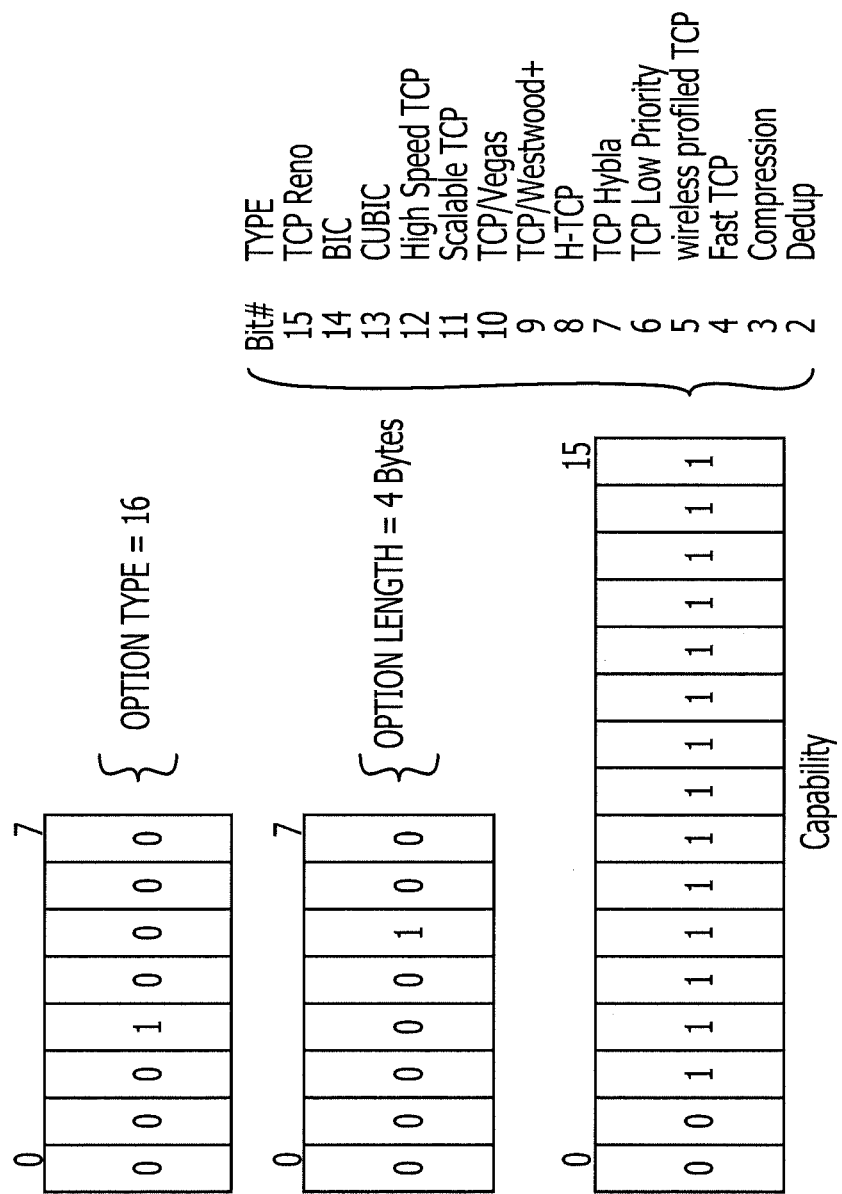
FIG. 18 illustrates an adaptive protocol capability option.

However, in the adaptive protocol capability option used in three-way handshake, an adaptive protocol capability option illustrated in FIG. 18 is used. FIG. 18 illustrates an adaptive protocol capability option. The adaptive protocol capability option has an option type "16" of 1 byte, an option length of 1 byte, and capability bits of 2 bytes. In FIG. 18, in addition to the usable protocol, capability, such as deduplication (Dedup) of bit #2 and Compression of bit #3, are set in the capability bits.

It is assumed in operations S52 to S56 that sporadic communication for transaction is performed.

It is assumed here that the application part 28 of the SWO changes the transmission pattern of the data though in the same session and transmits the data in a bulk transfer manner in operation S257.

When the application monitor 31 of the SWO monitors the writing of this data and detects that the pattern has changed, the application monitor 31 requests the optimum protocol selector 25 to select an optimal protocol and optimal function.

The optimum protocol selector 25 selects an optimal function and optimal protocol that match the characteristics by using the characteristics of the traffic and the communication quality of the network, which are detected by the application monitor 31, the function selection table illustrated in FIG. 19, and the protocol selection table illustrated in FIG. 20. It is illustrated in FIG. 19 that in no compression (that is, compression is possible) and in a bulk transfer, the functions of the cache/deduplication part 32 and the data compression and decompression part 33 are selected and that in the state of being compressed (that is, compression is not possible) and in sporadic transfer of transaction, the functions of the cache/deduplication part 32 and the data compression and decompression part 33 are not used. Furthermore, in FIG. 20, the average discard rate is divided into three levels, and in each level of the average discard rate, a TCP protocol Westwood, BIC, CUBIC, htcp, scalable, or the like is set in accordance with the average bandwidth rate of change of the three levels and the average delay time period of the three levels in the bulk transfer or the sporadic transfer of transaction.

For example, it is assumed that, at first, the traffic of the transaction is flowing in a non-compressed state (the average rate of discard=small, the average bandwidth rate of change=small, and the average delay=medium), and the compression function has been selected as the function, and the BIC has been selected as the TCP protocol. In this state, when the characteristic of the traffic is changed to a bulk transfer, the optimum protocol selector 25 selects compression and deduplication as the function and selects Westwood as the TCP protocol.

When the SWO selects the optimum protocol and function, the SWO specifies a protocol switching request illustrated in FIG. 21 in the TCP option, and transmits the data to the TWO. FIG. 21 illustrates a protocol switching request. The protocol switching request has an option type "17" of 1 byte, an option length of 1 byte, switching function bits of 2 bytes, and a switching sequence number of 4 bytes.

It is indicated in this protocol switching request that Westwood of bit #9, deduplication (Dedup) of bit #2, and Compression of bit #3 have been selected as switching functions. With respect to the above, the TWO responds with a protocol switching ACK (operations S258 and S26).

The procedure (operations S259, S260, S27, and S28) of the protocol switching in the SWO and the TWO are the same as the procedure (operations S58, S59, S7, and S8) of the protocol switching in the first embodiment. Furthermore, the optimum protocol selector 25 in the SWO and the TWO activates the data compression and decompression part 33 and the cache/deduplication part 32 (operations S261 and S29).

Hereafter, when the application part 28 of the SWO writes the data (operation S262), the data compression and decompression part 33 and the cache/deduplication part 32 of the SWO compress and cache the data, and thereafter transmit the data to the TWO by using the changed protocol (operation S263).

When the TWO receives the compressed data, the TWO decompresses this data. Furthermore, when the TWO receives the index of the cached data, the TWO refers to the cached data corresponding to this index and restores the original data (operations S30 and S31).

In the above-described embodiments, a description has been given by using the WAN acceleration device 18 as a basis. Alternatively, the mobile terminal and the server may be made to have a virtual WAN acceleration appliance.

In the present embodiment, not limited to changing a protocol, functions of compression and cache may be adaptively changed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission control method comprising:
performing communication between a transmission source communication device and a transmission destination communication device by using a transmission control protocol which includes a plurality of different congestion control functions corresponding to a plurality of different congestion control methods, respectively, each of the congestion control methods being a variant of the transmission control protocol;
causing, using a processor, when the transmission source communication device and the transmission destination communication device switch from a first congestion control function to a second congestion control function during the communication, at least one of a plurality of parameters for controlling operating states in the first congestion control function to be inherited by a parameter for controlling an operating state in the second congestion control function;
detecting, with at least one of the transmission source communication device and the transmission destination communication device, communication quality;
selecting, when a change in the communication quality is detected in the middle of a communication session, between the transmission source communication device and the transmission destination communication device, using the transmission control protocol for performing congestion control in accordance with the first congestion control function, the second congestion control function corresponding to at least one of a change of a delay of communication, a change of a bandwidth of communication, a change of a rate of discard of communication, and which data transfer type out of sporadic and bulk transfer the data transfer of the communication session is;
transmitting and receiving the selection of the second congestion control function between the transmission source communication device and the transmission destination communication device; and
switching from the first congestion control function to the second congestion control function at a synchronized timing between the transmission source communication device and the transmission destination communication device.

2. The transmission control method according to claim 1, further comprising switching from the first congestion control function to the second congestion control function at a timing at which a switching sequence number is transmitted and received and negotiated between the transmission source communication device and the transmission destination communication device.

3. The transmission control method according to claim 1, further comprising switching from the first congestion control function to the second congestion control function after temporarily stopping data transmission of the transmission source communication device.

4. The transmission control method according to claim 1, further comprising detecting a change in communication quality in the middle of the communication session, when a data transfer speed in a transport layer is less than a threshold value corresponding to a bandwidth that is assigned to a data link layer.

5. The transmission control method according to claim 1, further comprising detecting a change in communication quality in the middle of the communication session, when a change amount of at least one of a delay, a bandwidth, and a rate of discard of communication exceeds a certain threshold value.

6. The transmission control method according to claim 1, further comprising selecting, when a change in communication quality is detected in the middle of the communication session, whether or not a process for compressing and decompressing the transfer data and a process for caching and deduplicating the transfer data are used on the basis of whether or not the data transfer type and the transfer data have already been compressed.

7. A transmission control system comprising:
a plurality of communication devices including a transmission source communication device and a transmission destination communication device, the transmission source communication device and the transmission destination communication device performing communication with each other by using a transmission control protocol which includes a plurality of different congestion control functions corresponding to a plurality of different congestion control methods, respectively, each of the congestion control methods being a variant of the transmission control protocol, and at least one of the plurality of communication devices including:
an inheritance part that causes, when the transmission source communication device and the transmission destination communication device switch from a first congestion control function to a second congestion control function during the communication, at least one of a plurality of parameters for controlling operating states in the first congestion control function to be inherited by a parameter for controlling an operating state in the second congestion control function;
a detector that detects communication quality in at least one of the transmission source communication device and the transmission destination communication device;
a selector that selects, when a change in communication quality is detected in the middle of a communication session between the transmission source communication device and the transmission destination communication device, in which a transmission control protocol for performing congestion control in accordance with the first congestion control function is used, the second congestion control function corresponding to at least one of a change of a delay of communication, a change of a bandwidth of communication, a change of a rate of discard of communication, and which data transfer type out of sporadic and bulk transfer the data transfer of the communication session is;
a transmission and reception part that transmits and receives the selection of the second congestion control function between the transmission source communication device and the transmission destination communication device; and
a switching part that switches from the first congestion control function to the second congestion control function at a timing synchronized between the transmission source communication device and the transmission destination communication device.

8. The transmission control system according to claim 7, wherein the switching part switches from the first congestion control function to the second congestion control function at a timing at which a switching sequence number is transmitted and received by the transmission and reception part and negotiated between the transmission source communication device and the transmission destination communication device.

9. The transmission control system according to claim 7, wherein the transmission source communication device and the transmission destination communication device each include
 a compression and decompression part that performs a process for compressing and decompressing transfer data, and
 a cache and deduplication part that performs a process for caching and deduplicating the transfer data, and
wherein when the detector detects a change in communication quality in the middle of the communication session, the selector selects whether or not the compression and decompression part and the cache and deduplication part are used on the basis of whether or not the data transfer type and the transfer data have already been compressed.

10. A communication device comprising:
 a communication part that performs communication between a transmission source communication device and a transmission destination communication device by using a transmission control protocol which includes a plurality of different congestion control functions corresponding to a plurality of different congestion control methods, respectively, each of the congestion control methods being a variant of the transmission control protocol;
 an inheritance part that causes, when the transmission source communication device and the transmission destination communication device switch from a first congestion control function to a second congestion control function during the communication, at least one of a plurality of parameters for controlling operating states in the first congestion control function to be inherited by a parameter for controlling an operating state in the second congestion control function;
 a detector that detects communication quality;
 a selector that selects, when a change in communication quality is detected in the middle of a communication session between the transmission source communication device and the transmission destination communication device, in which a transmission control protocol for performing congestion control in accordance with the first congestion control function is used, the second congestion control function corresponding to at least one of a change of a delay of communication, a change of a bandwidth of communication, a change of a rate of discard of communication, and which data transfer type out of sporadic and bulk transfer the data transfer of the communication session is;
 a transmission and reception part that transmits and receives the selection of the second congestion control function between the transmission source communication device and the transmission destination communication device; and
 a switching part that switches from the first congestion control function to the second congestion control function at a timing synchronized between the transmission source communication device and the transmission destination communication device.

11. The communication device according to claim 10, wherein the switching part switches from the first congestion control function to the second congestion control function at a timing at which a switching sequence number is transmitted and received by the transmission and reception part and negotiated between the transmission source communication device and the transmission destination communication device.

12. The communication device according to claim 10, further comprising:
 a compression and decompression part that performs a process for compressing and decompressing transfer data; and
 a cache and deduplication part that performs a process for caching and deduplicating the transfer data,
wherein when the detector detects a change in communication quality in the middle of the communication session, the selector selects whether the compression and decompression part and the cache and deduplication part are used on the basis of whether or not the data transfer type and the transfer data have already been compressed.

13. The communication device according to claim 10, wherein the communication device is one of the transmission source communication device, the transmission destination communication device, and another communication device.

14. A communication device comprising:
 a processor configured to:
 cause, when the transmission source communication device and the transmission destination communication device switch from a first congestion control function to a second congestion control function, at least one of a plurality of parameters for controlling operating states in the first congestion control function to be inherited by a parameter for controlling an operating state in the second congestion control function, the transmission source communication device and the transmission destination communication device performing communication with each other by using a transmission control protocol which includes a plurality of different congestion control functions corresponding to a plurality of different congestion control methods, respectively, each of the congestion control methods being a variant of the transmission control protocol; and
 detect communication quality;
 select, when a change in the communication quality is detected in the middle of a communication session, between the transmission source communication device and the transmission destination communication device, using the transmission control protocol for performing congestion control in accordance with the first congestion control function, the second congestion control function corresponding to at least one of a change of a delay of communication, a change of a bandwidth of communication, a change of a rate of discard of communication, and which data transfer type out of sporadic and bulk transfer the data transfer of the communication session is;
 transmit and receive the selection of the second congestion control function between the transmission source communication device and the transmission destination communication device; and
 switch from the first congestion control function to the second congestion control function at a synchronized timing between the transmission source communication device and the transmission destination communication device; and
 a memory configured to store parameters for the transmission control protocol.

15. A computer-readable, non-transitory recording medium to store transmission control program that causes a computer to execute a procedure, the procedure comprising:
 performing communication between a transmission source communication device and a transmission destination communication device by using a transmission control protocol which includes a plurality of different congestion control functions corresponding to a plurality of different congestion control methods, respectively, each of the congestion control methods being a variant of the transmission control protocol;

causing, when the transmission source communication device and the transmission destination communication device switch from a first congestion control function to a second congestion control function, at least one of a plurality of parameters for controlling operating states in the first congestion control function to be inherited by a parameter for controlling an operating state in the second congestion control function;

detecting, with at least one of the transmission source communication device and the transmission destination communication device, communication quality;

selecting, when a change in the communication quality is detected in the middle of a communication session, between the transmission source communication device and the transmission destination communication device, using the transmission control protocol for performing congestion control in accordance with the first congestion control function, the second congestion control function corresponding to at least one of a change of a delay of communication, a change of a bandwidth of communication, a change of a rate of discard of communication, and which data transfer type out of sporadic and bulk transfer the data transfer of the communication session is;

transmitting and receiving the selection of the second congestion control function between the transmission source communication device and the transmission destination communication device; and switching from the first congestion control function to the second congestion control function at a synchronized timing between the transmission source communication device and the transmission destination communication device.

* * * * *